(12) United States Patent
Braunstein

(10) Patent No.: US 9,460,645 B2
(45) Date of Patent: Oct. 4, 2016

(54) APPARATUS INTELLIGENT ILLUMINATED SIGN, METHODS OF CONFIGURATION AND CONTROLS

(71) Applicant: Zachary Leonid Braunstein, San Marcos, CA (US)

(72) Inventor: Zachary Leonid Braunstein, San Marcos, CA (US)

( * ) Notice: Subject to any disclaimer, the term of this patent is extended or adjusted under 35 U.S.C. 154(b) by 53 days.

(21) Appl. No.: 14/455,928

(22) Filed: Aug. 10, 2014

(65) Prior Publication Data

US 2015/0294603 A1    Oct. 15, 2015

Related U.S. Application Data

(60) Provisional application No. 61/864,879, filed on Aug. 12, 2013, provisional application No. 61/894,130, filed on Oct. 22, 2013.

(51) Int. Cl.

| | |
|---|---|
| G09F 13/22 | (2006.01) |
| H05B 37/02 | (2006.01) |
| H05B 33/08 | (2006.01) |
| G09F 27/00 | (2006.01) |
| G09F 13/04 | (2006.01) |
| G09G 3/34 | (2006.01) |
| G09F 7/04 | (2006.01) |
| G09F 13/00 | (2006.01) |
| G09G 3/00 | (2006.01) |

(52) U.S. Cl.
CPC ............. *G09F 13/22* (2013.01); *G09F 7/04* (2013.01); *G09F 13/005* (2013.01); *G09F 13/04* (2013.01); *G09F 27/005* (2013.01); *G09G 3/004* (2013.01); *G09G 3/3406* (2013.01); *H05B 37/0218* (2013.01); *H05B 37/0227* (2013.01); *H05B 37/0245* (2013.01); *G09F 2013/222* (2013.01); *G09G 2330/021* (2013.01); *G09G 2360/144* (2013.01); *Y02B 20/46* (2013.01); *Y02B 20/48* (2013.01)

(58) Field of Classification Search
None
See application file for complete search history.

(56) References Cited

U.S. PATENT DOCUMENTS

| | | | |
|---|---|---|---|
| 6,528,954 B1 * | 3/2003 | Lys .................. | A61N 5/0616 315/158 |
| 7,019,276 B2 * | 3/2006 | Cloutier ............ | H05B 37/0254 250/214 AL |
| 8,099,261 B2 * | 1/2012 | Braunstein ........ | G09F 9/33 703/1 |
| 2002/0084891 A1 * | 7/2002 | Mankins ........... | B60Q 1/2611 340/425.5 |

(Continued)

*Primary Examiner* — Crystal L Hammond

(57) ABSTRACT

Apparatus intelligent illuminated sign comprising: controller, sensors, illumination devices, interfaces, power source. Apparatus configurations include: display, sensor, operator interface, controller interface, acceptance criteria, control algorithm. Display providing parallel view illumination, with mounting configuration including replacement without impacting integrity of apparatus. Sensors include: ambient light, proximity, temperature, power. Plug and power source includes intelligent power splitter, sustaining operation of apparatus during power outage. Operator interface include interrupting ambient light for triggering sensor status. Controller interface include: LAN, INTERNET, mobile devices. Acceptance criteria include: optimization using energy, sustaining apparatus safety and contributing to safety of surrounding environment. Control algorithm includes: executing real-time self-diagnostics, and controls to sustain apparatus operation within acceptance criteria, maintaining predefined safety margins using components of apparatus, maintaining reliability and maximizing operating life of apparatus. Apparatus configurable in compliance with local and national regulations for applications as intelligent illuminated: street address sign, street name sign; building sign, traffic sign.

20 Claims, 10 Drawing Sheets

(56) References Cited

U.S. PATENT DOCUMENTS

| | | | | |
|---|---|---|---|---|
| 2005/0151489 A1* | 7/2005 | Lys | B60Q 1/2696 | 315/308 |
| 2010/0141153 A1* | 6/2010 | Recker | H05B 33/0803 | 315/149 |
| 2011/0101868 A1* | 5/2011 | Weiss | H05B 37/0245 | 315/130 |
| 2011/0133655 A1* | 6/2011 | Recker | H02J 9/02 | 315/159 |
| 2012/0080944 A1* | 4/2012 | Recker | H02J 9/02 | 307/25 |
| 2012/0206050 A1* | 8/2012 | Spero | B60Q 1/04 | 315/152 |
| 2012/0235579 A1* | 9/2012 | Chemel | F21S 2/005 | 315/152 |
| 2012/0306382 A1* | 12/2012 | Maxik | F21S 2/00 | 315/152 |
| 2013/0063045 A1* | 3/2013 | Ishikita | H05B 37/0272 | 315/296 |
| 2013/0334881 A1* | 12/2013 | Jones | H02J 4/00 | 307/23 |
| 2014/0239817 A1* | 8/2014 | Leinen | H05B 37/02 | 315/152 |
| 2014/0354161 A1* | 12/2014 | Aggarwal | H05B 37/0245 | 315/153 |
| 2015/0163881 A1* | 6/2015 | Pederson | H05B 33/0863 | 315/154 |
| 2015/0296599 A1* | 10/2015 | Recker | H05B 37/0272 | 315/153 |

\* cited by examiner

Apparatus Intelligent Illuminated Sign, Methods of Configuration and Controls

*Apparatus Intelligent Illuminated Sign, Methods of Configuration and Controls*

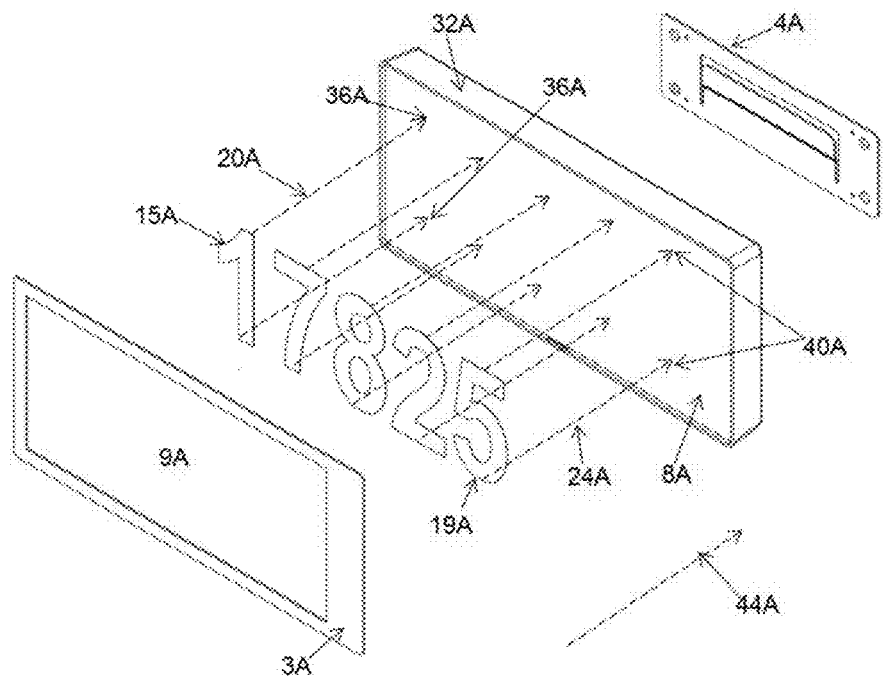
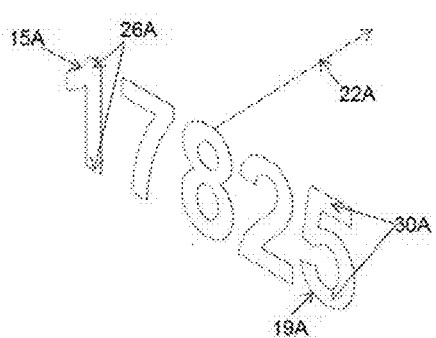
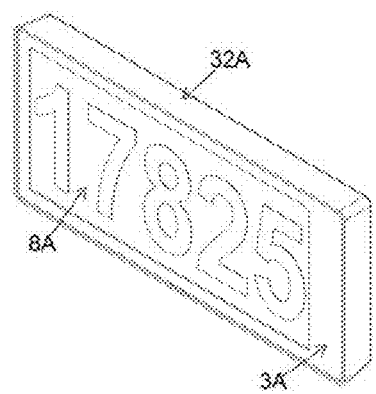
FIG. 10
FIG. 11
FIG. 12

*Apparatus Intelligent Illuminated Sign, Methods of Configuration and Controls*

*Apparatus Intelligent Illuminated Sign, Methods of Configuration and Controls*

*Apparatus Intelligent Illuminated Sign, Methods of Configuration and Controls*

APPARATUS INTELLIGENT ILLUMINATED SIGN, METHODS OF CONFIGURATION AND CONTROLS

CROSS-REFERENCE TO RELATED APPLICATIONS

I claim the benefits of Provisional Application No. 61/864,879 filed on Aug. 12, 2013, title "Illuminated Building Sign with Configurable Display and Faceplate" and Provisional Application No. 61/894,130 filed on Oct. 22, 2013, title "Apparatus Intelligent LED Illuminated Sign, Methods of Configuration and Controls".

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable

BACKGROUND OF THE INVENTION

Illumination devices, including signs, gain popularity in a variety of application, including: illuminated street address signs; illuminated street name signs; status signs; direction signs; etc. Majority of these devices, signs in particular, lack intelligence, i.e. embedded controls. As result, these devices: have limited or no configuration options; lack self-diagnostics, which would allow the device to monitor the environment, and adjust its performance in order to sustain reliability and longevity of the device; lack efficiency in utilizing energy resources powering the device, etc.

With emergence of intelligent illuminated signs, such as streets address signs, street name signs, status signs, direction signs, etc., there is a need for convenient methods which would support the sign configuration options and controls. In addition, illuminated devices, signs in particular, will need to comply with local and state ordinances. As technology is moving forward, the ordinances are revised to take advantages of emerging technologies.

It would be beneficial to have intelligent illumination devices, including signs, which can be initially configured to meet current regulations, including ordinances, and then conveniently re-configured to incorporate modifications to the ordinances.

Example 1

An intelligent illuminated sign complying with current ordinances can be installed and operational. If the sign monitoring and controlling its power consumption, then later it can be re-configured to lower its maximum power consumption to meet new requirements of a revised ordinance.

Example 2

An intelligent illuminated sign complying with current ordinances can be installed and operational. If the sign is using illumination devices such as LED's, and is monitoring and controlling the illumination power intensity, then later it can be re-configured to increase its illumination intensity to meet new requirements of a revised ordinance.

Example 3

An intelligent illuminated sign complying with current ordinances can be installed and operational. If the sign is using ambient light sensor, and is capable of controlling the illumination power intensity, then later it can be re-configured to control the illumination per status of the ambient light, to meet new requirements of a revised ordinance.

Example 4

An intelligent illuminated sign complying with current ordinances can be installed and operational. If the sign is using internal temperature sensor, and is capable of controlling the illumination power intensity, then later it can be re-configured to control the illumination per status of the internal temperature, to meet new requirements of a revised ordinance.

There are a number of applications, which require a building sign illuminating a static image, to support replacement of the static image, as needed. There is no product available allowing to replace an illuminated image within a very short period of time, such as few seconds.

Majority of intelligent illumination devices require DC power. For security and safety requirements these devices need to be powered from a number of DC power sources, sustaining operation of these devices during power outage. There is no convenient method supporting configuration when at least one power source is connected when the other power sources have failed or not available.

BRIEF SUMMARY OF THE INVENTION

The application describes apparatus intelligent illumination device comprising: controller, sensors, illumination devices, interfaces, power source. Sensors include: ambient light, proximity, temperature, and voltage, current. Power source includes intelligent power splitter. Configuration methods include: display, operator interfaces, controller interfaces. Operator interfaces include: interrupting ambient light triggering sensor status, wireless remote. Controller interfaces include: LAN, INTERNET. Controller uses pre-defined sensor triggering sequences by operator, such as: duration, frequency, combination of both, allowing operator setting new configuration. Remote controller uses pre-defined protocol setting new configuration. New configuration includes: sensors operating limits; time based controls; and control algorithm. Configuration and controls are stored in non-volatile memory. Operating limits include: power applied to illumination devices; energy consumption by apparatus. Control algorithm includes real-time self-diagnostics and controls to achieve criteria set by configuration. Apparatus configurable in compliance to local and national regulations for applications as intelligent illuminated: street address sign, street name sign; building sign, traffic sign.

The apparatus includes: illuminated object, or object being illuminated; illuminated panel; illumination components; sensors; controllers; interfaces; enclosure. For simplicity, further references to devices, include: street address signs; street name signs; general signs; general lighting. For simplicity, further references to signs, include: street address signs; street name signs; general signs; general lighting. For simplicity, further references for controller, include: embedded controller, light controller. LED controller.

For apparatus configured for illuminated sign the illuminated object includes: art, characters, combination of both, which are either attached to the: front side of the illumination panel; backside illumination of the illumination panel; or placed in-front of the illumination panel; or combination of. Illuminated panel includes: acrylic partially translucent panel, with the backside of the panel being backlit by the illumination components.

For apparatus configured for general lighting the illuminated object is the illumination panel itself, which may include: art, characters, combination of both, which are either attached to the: front side of the illumination panel; backside illumination of the illumination panel; placed in-front of the illumination panel; or combination of. Illuminated panel includes: acrylic partially translucent panel, with the backside of the panel being backlit by the illumination components.

Illumination components of the apparatus include: solid state illumination devices, such as LED's. Single color, or multi-color devices can be used. Illumination components direct majority of their light parallel to the backside of the illumination panel. Sensors include: ambient light; internal temperature; power parameters voltage, current; proximity. Interfaces include: wireless, such as infra-red remote; wireless network, such as INTERNET; wireless interface to mobile devices, such as cell phones; operator interface, such as: audio/voice; Infra-red remote; use of ambient light sensor blocking the sensing window of the sensor to register action.

The apparatus can be configured for applications to improve visibility of: residential street addresses; general building addresses, including commercial and industrial type; street names; general signs, such as information signs: "OPEN", "CLOSE", "EXIT", etc. The apparatus includes signs described in U.S. Pat. No. 8,099,261 "Low Cost Solid-State Identification Devices". The controller of the apparatus is connected to sensors and interface components. The controller of the apparatus can be configured to store in its non-volatile memory trigger points for sensors, which can be set for each sensor. Trigger points for ambient light sensor include different levels of ambient light. Trigger points for proximity sensor include different distances of a detectable object from the apparatus. Trigger points for temperature sensor include different levels of temperatures within the apparatus. Trigger points for power voltage sensor include different levels of voltage of the power supply powering the apparatus. Trigger points for power voltage sensor include different levels of: voltage of the power supply powering the apparatus; voltage applied to components of the apparatus. Trigger points for current sensor include different levels of: current of the power supply powering the apparatus; current applied to components of the apparatus. Configuration of the apparatus includes control algorithm associated with each trigger point of a sensor. Control algorithm based on ambient light sensor includes: adjusting power to illumination devices per set trigger points of the ambient light sensor, including turning the power OFF when there is sufficient level of ambient light.

Control algorithm based on proximity sensor includes: adjusting power to illumination devices per set trigger points of the proximity sensor, including increasing the illumination intensity when an object is detected, and then going back to original setting when the object is no longer detected.

Control algorithm based on temperature sensor includes: adjusting power to illumination devices per set trigger points of the internal temperature sensor, including turning the power OFF when the temperature reached a trigger point considered too low or too high for sustaining operation of the apparatus for longevity as listed in the apparatus specifications. Control algorithm includes turning ON illumination devices, including LED's, when the ambient temperature falls below predefined level, and using illumination devices for generating self-heating of the interior area of the apparatus, extending operation of the apparatus at low temperatures. The control algorithm ensures the apparatus is operating within the apparatus specification parameters at all times. The acceptable operating criteria for the apparatus and the control algorithm to achieve the acceptable operating criteria are stored in the non-volatile memory of the apparatus. Apparatus by monitoring sensors and executing control algorithms based on their status can be classified as apparatus performing self-diagnostics with the main objective to avoid premature failure, and maintain apparatus in good working condition during projected time of longevity. Results of self-diagnostics can be communicated by the apparatus to operator via specific status of the illumination components, such as: color, blinking. Results of self-diagnostics can be communicated by the apparatus to remote controller over wireless interface. The apparatus can be configured and controlled by voice commands from the operator.

Voice commands can be simple one, two or three character commands. The apparatus can acknowledge the status of the apparatus to the operator by using illumination devices: color, blinking at predefined frequencies. Configuration and controls of the apparatus can be executed by remote controller over wireless interface, and the apparatus can acknowledge the command received from the host by echoing the same command back to the remote controller. The value of trigger points and associated control algorithm are stored in controller non-volatile memory. The value of trigger points and associated control algorithm can be stored in a remote controller, as part of "cloud" technology, and other innovations available through wireless interfaces. Operator can use the ambient light sensor to configure the apparatus, and select or set specific trigger points for each sensor. Operator can use the proximity sensor to configure the apparatus, and select or set specific trigger points for each sensor. The apparatus with wireless interface can be configured and re-configured remotely, by a remote controller over wireless interface network, including INTERNET. During the initial installation, the apparatus is configured per requirements of the local ordinances, which can include: maximum power consumption; limits of illumination power; requirement to use ambient light sensor to control illumination. After installation, there can be a need to change the configuration. The need can come from changes in ordinances.

Example 1 of changes in configuration which are related to the sign power efficiency, lowering the maximum power consumption during ON state. Based on these changes the apparatus can be re-configured by the: operator locally, or by a remote controller over wireless interface, to meet the new requirements. The re-configuration is this case will include lowering the trigger point for maximum power consumption, which can be achieved by lowering the maximum illumination power.

Example 2 of changes in configuration which are related to the sign illumination intensity, adjusting illumination higher, as the illumination devices are recognized as being more efficient during ON state. Based on these changes the apparatus can be re-configured by the: operator locally, or by a remote controller over wireless interface, to meet the new requirements. The re-configuration in this case will include increasing the trigger point for maximum illumination power, which can be achieved by increasing the maximum illumination power.

Example 3 of changes in configuration which are related to the sign controls, requesting the sign illumination to be controlled by a photo-switch, turning the sign ON when there is insufficient ambient light, and then OFF when there is. Based on these changes the apparatus can be re-configured by the: operator locally, or by a remote controller over wireless interface, to meet the new requirements. The re-configuration in this case will include use of trigger points of the ambient light sensor to control ON-state and OFF-state for illumination devices. ON-state trigger point would represent insufficient ambient light, as it happens during evening and night hours. OFF-state trigger point would represent sufficient amount of ambient light, as it happens during morning and day hours.

The apparatus can use the ambient light sensor to adjust the intensity of the illumination power per set trigger points of the ambient light sensor, providing sufficient amount of illumination so that the image or illuminated component of the sign, will be visible at all times. This is important for apparatus applications as: street address number signs, street name signs.

The apparatus control algorithm can be configured under all circumstances the self-diagnostics is the top priority and will overwrite other configurations and controls to ensure the apparatus is functional per specifications, including in terms of reliability and longevity.

The apparatus can be used for illuminating: street address signs; street name signs, and general building signs, including the signs patented under U.S. Pat. No. 8,099,261. Apparatus when used as intelligent illuminated signs, will provide required illumination of an object, making the object visible, as part of identification. The apparatus configured for intelligent sign can execute specific controls to indicate also status of an object. This can be achieved by changing illumination properties, including: colors of illumination, blinking, illuminating specific sections of the signs. Intelligent illuminated signs can also have sensors, allowing the embedded controller to perform self-diagnostics, including monitoring ambient environment, and adjusting the controls for: sustaining reliability and longevity of the product, maintaining efficiency of utilizing energy resources powering the sign, etc. Intelligent illuminated signs can be configured with preset limits of controllable parameters, and then embedded or remote controls of the sign can be based on reaching those limits. Preset limits can include: level of ambient light; internal temperature; voltage of the power supply; current consumption by the sign or sections of the sign. Intelligent signs can have controls or control algorithms associated with each preset limit, or trigger point. Specific controls or control algorithms can be execute by embedded controller of the intelligent sign based on occurrence of an event, such as a limit or trigger point, or combination of trigger points. All configuration parameters and control algorithms can reside in the non-volatile memory of the controller. Intelligent signs can have wireless interfaces, which will allow storing all or portion of configuration parameters and control algorithms on a remote non-volatile memory, using technology such as "cloud", etc. Intelligent signs with wireless interfaces can be technologically compatible with latest technologies in sharing computing and storage resources, including remote. The application also describes convenient methods of configuration and controls of the apparatus by: operator; remote controller.

In support of configuration and controls by the operator of the apparatus configured for intelligent illumination signs, the apparatus can use existing illumination devices, or additional status LEDs, to indicate the status of the apparatus, and guide the operator through configuration, acknowledging each step and status with a specific visual indication based on any of the: color change; blinking at certain frequency and duration. The apparatus can be configured with audio interface, allowing operator executing specific configuration or controls via respective audio command. The apparatus can communicate back with echo, or other predefined responses as part of acknowledgement. The apparatus can communicate in audio providing operator with instructions. The apparatus wireless interfaces will include INTERNET, and mobile devices. The apparatus operator interface includes:

1) Use of ambient light sensor, providing operator with a convenient interface to trigger sensor status by blocking the sensor light sensing window with an object preventing the sensor "seeing the light", i.e. creating "dark" state, and as result triggering the respective preset limit
2) Use of proximity sensor, providing operator with a convenient interface to trigger sensor status by approaching the sensor within its working distance, and as result, triggering the respective preset limit The apparatus configured for intelligent illumination sign include signs providing illumination only, or illumination and status for: residential street addresses; street names; street addresses of a commercial and industrial buildings; identification signs, such as signs identifying a booth address or number at a show, convention, exhibits, etc., or a sign indicating status of a cashier station at a store. The invention also describes illuminated sign with configurable display and faceplate. Sign has an area illuminated by solid-state devices, such as LEDs, installed inside the sign. The illuminated area can be configured with combination of pockets installed along the perimeter of the illuminated area, and pockets accessible from exterior of the sign. The illuminated area can be configured with magnets installed behind the illuminated area, and as result not visible from outside. Sign sheet can be configured as a transparency sheet, and further configured of size and properties to match the outline of the illuminated area of the sign, and allow the light generated by the LED's under the illuminated area to pass through. The sign sheet can be further configured with tabs to fit into the pockets of the sign area, securing the sign sheet position in respect to the illuminated area of the sign. Faceplate can be configured with magnets to match in terms of location and magnetic properties with the location and magnetic properties of the magnets of the illuminated area. Sign sheet can be placed on top of the illuminated area, and when configured with tabs, the tabs are inserted into the pockets securing the sign sheet position in respect to the illuminated area of the sign. The faceplate can be installed on top of the sign sheet configured without tabs, and when the faceplate is held in close proximity to the matching magnets of the illuminated area, the magnets of the faceplate will attract to the magnets of the illuminated area, and as result the faceplate will fasten to the illuminated area, securing the sign sheet position in respect to the illuminated area. The sign sheet is sort of sandwiched in-between the faceplate and the illuminated area. The sign sheet can contain any combination of art and/or characters embedded onto the sheet, which can be visible under ambient light, and when illuminated by LEDs of the sign, can be also visible without ambient light. The sign sheet can be configured to accept and combination of art and/or characters, which can be embedded or attached by means of printing, and/or gluing. Characters can be configured with colors and shapes to fit within the illuminated area of the sign. The sign can be configured without the sign sheet and without the faceplate. The illuminated area of the sign can be configured from a translucent material, such as acrylic with appropriate level of translucency, and the dimensions of the material can be selected to provide steady surface, which can be used to seal the perimeter of the sign, and also act as a light diffusing component improving light distribution along its surface. The surface of the illuminated area can be configured to accept any combination of art and/or characters either directly by means of gluing, as example. Magnets mounted on the inside of the illuminated area can be arranged in order to support selected art and/or characters to be attached to the illuminated area one at a time or in groups, with each art and/or character having at least one magnet to secure its position to the illuminated area by attracting to the respective magnets of the illuminated area. When art and/or characters installed by use of magnets, the magnets are not visible, and position of the characters can be adjusted to create a street address number, as example. Another method is simply gluing any combination of characters and/or art to the surface of the illuminated area. The methods described above can be used for creating illuminated street address signs, and other applications. Using replaceable sign sheets or symbols with magnets will allow reconfiguring the content of the sign, as needed, in a very short period of time. Using glue will make the re-configuration a lot more complicated, if not impossible. As result, use of replaceable sign sheets and/or symbols with magnets is the most effective method for illuminated signs with re-configurable displays.

The power source of the apparatus includes configurations to provide DC power to a DC powered device or devices connected to the apparatus from a number of DC power sources connected to the apparatus, and the apparatus monitoring connected devices, and the apparatus providing controls to each device connected to the apparatus. Controls include providing protection to each power source from being affected by other power sources connected, and protect the DC powered devices or loads to ensure all power sources and the device itself are powered within respective specifications. The power source of the apparatus can be configured as a harness interconnecting the power supplies on the supply side(s) of the harness, and connecting the DC power device(s) or the load side(s) to the load of the harness. The protection devices in this configuration are hard-wired inside the harness. The interface connectors for the power devices can be configured to match with specific power input connections of the power supply to avoid plugging a power supply into a wrong power input. The interface connectors for the power loads can be configured to match with specific power output connections of the power loads to avoid plugging a power load into a wrong power output. The power source of the apparatus includes configurations to provide safe interface between multiple DC power sources and a single or multiple DC power device(s), with controls and protection to all interconnected components, including protection of each power supply form being affected by other power supplies connected; and protection of the DC powered device or load to ensure the power applied to the device is within the specifications of the device. The power source can be configured to ensure that at least one power source, such as battery pack, will sustain operation of the load(s) when other power sources have failed. The power source of the apparatus can be configured to include a configurable controller, which communicates with a remote HOST via wired or wireless interfaces, including INTERNET, and to control the apparatus and execute control commands sent by the HOST in real time. The control functions and commands, which can be scheduled or executed in real time, will include:

a) Selecting a specific power source or sources and connecting it (them) to a specific power load or loads.
b) Monitoring via sensors vital electrical parameters of each power source and power load connected to apparatus
c) Monitoring via sensors vital electrical parameters of the apparatus itself (components inside, interfaces, etc.) each power source and power load connected to apparatus
d) Based on information obtained from sensors, executing in real-time without operator assistance a predefined algorithm stored in the non-volatile memory of the controller to achieve criteria defined and stored in the HOST non-volatile memory, and criteria including: safety of apparatus and all devices connected to apparatus; standard power availability to a connected load at specified times; backup power availability to a connected load at specified times

BRIEF DESCRIPTION OF DRAWINGS

Drawing Content and Listing

FIG. 10: 3D view of major components of an apparatus configured for illuminated sign using numbers '17825' as an example with each number having at least one magnet to secure each character directly to the illuminated area with magnets from opposite side, and which are positioned or allocated for each character to attract the magnet of the character, and secure the character in position. Faceplate is optional. There is no sign sheet required.

FIG. 11: 3D view of numbers '17825' as an example with each number having at least one magnet which can be used to secure each character to an illuminated area with matching magnets from inside the area which are allocated for each character to attract the magnet of the character, and secure the character in position.

FIG. 12: 3D view of an assembled apparatus configured for illuminated sign with a sign '17825' as an example with each number secured to the illuminated area by magnets as illustrated on FIG. 11. Faceplate installed for decoration. There is no sign sheet required.

DRAWING CONVENTION AND FORMAT

Figure 1:
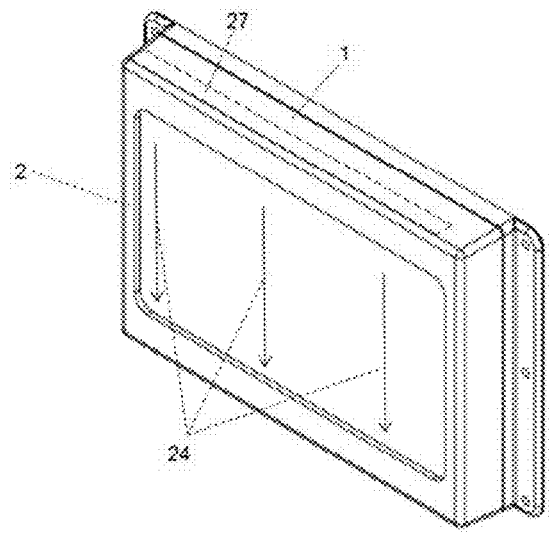
FIG. 1: 3D view example of an apparatus configured for illuminating street address with illumination devices back-lighting from top of the sign toward bottom of the sign.

Drawings with this application, in addition to USPTO requirements, are:
a) Not to scale.
b) Dashed lines are used for outlining a group of parts, sub-assemblies and assemblies, which can be identified by unique number as a sub-assembly or as an assembly

DEFINITIONS

My application contains definitions of specific components or processes, which are listed below. Definitions are used and expanded in greater details in later paragraphs.

Ambient Light Sensor
  Defined as a Sensor which detects level of ambient light, and generate signal proportional or representing levels of ambient light. The apparatus configuration includes provision for a sensing window, allowing the ambient light sensor to be exposed to ambient light. Ambient light sensor is connected to the controller of the apparatus. Controller will measure the signal generated by the ambient light sensor and based on specifications of the ambient light sensor, calculate amount of ambient light present. Controller performs controls associated with preset trigger points of the ambient light sensor. Ambient light sensor configuration includes interface between operator and controller. By blocking the sensing window of the ambient light sensor preventing the ambient light reaching the sensor, the operator can trigger the status of the ambient light sensor between two states: state 1—ambient light present at a level above preset minimum level; state 2—ambient light is not present, or is below the preset minimum level limit. By triggering these states at predefined sequences, operator can execute commands related to apparatus: configurations and controls.
Backlighting
  Defined, as a method of positioning illumination devices, including solid state, behind a surface, which is required to be illuminated. Backlighting includes illumination of an entire surface, or a selected section of a surface. The surface includes art, which is created on a material which will allow a light placed behind it seen through.
Battery
  Defined as a battery which can be configured as a conventional battery pack, or solar battery, or another power storage device within required power specifications.
Controller
  Defined as a PC board, including flexible, which can house components, including: electronic Control devices—embedded controllers and support electronics; Light Sources, including LED's; communication electronics for wired and/or wireless communications with a remote host computer, other Modules; sensors which detect change in exterior lighting, and which are used by Controller to optimize required illumination intensity; sensors which detect ambient temperature, and which are used by Controller to optimize amount of drive power of illumination components; sensors which detect motion of an object, and are used by Controller for add-on security feature—to either acknowledge the event, or sound an alarm of an intruder; driver electronics which are used to power electronics and other devices; sensors, which are used for remote control; interface connectors; The Controller configuration parameters include: size, thickness, shape to meet requirements of a specific application. Controller power source includes power sources with respective DC power specifications (voltage, current, ripple, temperature range): AC-DC power converters; solar energy collection technology based DC power source; batteries, Controller configurations include interface to remote devices, including: remote Controller via LAN; other devices, including activation relays via direct wiring interfaces; with an objective to provide required level of control for a specific application.

Communication Interface
   Defined as serial communications between Light Controller and variety of devices, including: remote computer, remote Controller, remote Module, Communication Interface includes standard communication platforms, such as: RS232, USB, wireless technologies, such as cellular, INTERNET. Communication Interface configurations include support for multi-drop LAN, which allow connection of several Light Controllers via LAN to remote computer, or Controller.

Control
   Defined as electronic component or embedded control device within the apparatus configured to monitor status of Sensors, and based on embedded algorithm execute controls in real-time to attain criteria stored in its memory, and can interface to remote HOST via wired or wireless interfaces, including INTERNET. Controller can be configured to include interface for local operator, and support operator ability to preset control functions. Controller can be configured to include self-diagnostics and report its status to remote HOST and local operator via visual and voice signals.

Control Function
   Defined as a function, which is executed by a Controller upon occurrence of an event, including: direct request by an user via wireless remote control device; condition when a specific Trigger Point of a Sensor has been reached; request by a remote Controller over LAN. Control Function includes: tuning ON/OFF devices.

DC Power Source
   Defined as a device configured for converting AC power to DC power, and providing respective interface connections for the input AC power and respective interface connections for the output DC power.

DC Power Load
   Defined as a device requiring DC power for operation. Example: DC powered light.

Enclosure
   Defined as a configuration of the apparatus with all components of the apparatus enclosed inside an enclosure. Example: enclosure configured with 2 power input connections on one side, and one power output connection on another side, and all control and protection components wired inside in a form of a harness or printed circuit board. Enclosure configurations include providing space for: controller, sensor, wireless interfaces, operator interfaces.

Harness
   Defined as a configuration of an interface of the apparatus with all components of the interface embedded into flexible cabling with appropriate power rating. Example: a harness consisting of 2 power input connections with each connection having an embedded diode protecting each power source from receiving current, and power output connection for connecting a power load.

Input
   Defined as a general purpose input, including a power input, of a component within the apparatus, which is configured to accept signals, including power signals from DC Power Source. For 12V applications, input configuration includes female power receptacles industry standard 5.5 mm inside diameter barrel with 2.1 mm pin.

Illumination Control
   Defined as control of the illumination components of the apparatus. The configuration of the controller of the apparatus includes control of illumination devices, including light parameters: intensity, color, special effects.

Illumination Parameters
   Defined as a variety of Light Control parameters affecting the illumination produced by illumination devices of the apparatus. Illumination Parameters include: illumination ON/OFF control; illumination intensity; illumination color; illumination cycling ON/OFF at selected frequency with respective selection of ON-cycle and OFF-cycle; illumination sequence.

Illumination Device
   Defined as a solid-state device, including LED.

Illumination Panel
   Defined as a panel placed in front of Illumination Device (s). Configuration of the illumination panel include Symbol(s) placed on any side of the panel.

Light Control
   Defined as electronic Control of Light Parameters including controls of an individual solid-state Light Source, or controls of a group of solid-state Light Sources. The Controller configuration includes light controls including:
   a) Cycling ON/OFF with stable or variable—ON-time, OFF-time, cycling frequency
   b) Dynamically changing drive power, including changing either voltage, or current, or both, which can increase illumination intensity
   c) Applying Controls listed in (a) dynamically to a group of Lights in one direction, or changing directions
   d) Dynamically changing selected group of Lights in terms of their location and number of Lights within a group Light Controller
   Defined as a controller, which is configured to execute required Light Control functions in respect to illumination devices of the apparatus which are requested by operator or remote host computer.

Output
   Defined as a general purpose output, including power output, of a component within the apparatus, which is configured to provide power to DC Power Load. For 12V applications, output configuration includes male plug industry standard barrel of 2.1 mm inside diameter by 5.5 mm outside diameter.

Sensor
   Defined as a component or device within the apparatus, which is designed to sense a specific parameter including: power parameters (voltage, current), ambient parameters (temperature, humidity). Sensor is interfaced to control electronics. Sensor configuration includes sensor-specific Trigger Points or set levels, including set levels programmed by an user, and which are stored in a non-volatile memory of the Controller. The Controller in real-time monitors Sensors, and detects condition when a respective Trigger Point has been reached. Controller configuration includes executing a Control Function, as programmed or set by an user, when a specific Trigger Point or combination of Trigger Points has been detected. Sensor configuration includes monitoring specific parameter of the apparatus, including: power parameters (voltage, current), ambient parameters (light, temperature, humidity, motion). Sensor configuration includes interfacing to control electronics.

Symbol
  Defined as any single or combination of: alpha character, numeric character, art. Symbol configuration includes attachment of the symbol to the illumination panel by means of: silk-screening, printing, painting, gluing.

Trigger Points
  Defined as an user set or pre-programmed level or value associated with a specific Sensor, which is detected by Controller Trigger Points are stored in a non-volatile memory of Controller. Controller in real-time monitors Sensors, and detects condition when a respective Trigger Point has been reached. Controller executes a Control Function, as programmed or set by an user, when a specific Trigger Point or combination of Trigger Points has been detected.

DRAWINGS

Unless noted otherwise, for simplicity the physical location of the components of the apparatus, such as: controller; sensors; interfaces—are not shown. These components will reside inside the apparatus enclosure or outside the apparatus enclosure. The apparatus is designed to meet specifications requirements, including ambient ratings and compliance to regulations of local and national agencies. Sensors will be mounted in a location within the enclosure supporting sensor operation, or functionality. The controller of the apparatus can be installed on the same PCB as the illumination devices, or can be installed on a separate PCB, which is interfaced to PCB containing illumination devices. The local controller will contain the drive circuitry for providing controlled power to illumination devices. Unless noted otherwise, for simplicity the sensors for monitoring: temperature, proximity, ambient light, power available to drive the illumination devices, are not shown on the drawings. The sensors can be installed on: the same PCB as the illumination devices; on the same PCB as local controller, on separate PCB; or hard-wired by harness. Apparatus can be configured as a system of apparatuses. In an apparatus configured as a system, each apparatus can be configured with its own resources, such as controller, sensors, and interfaces. In an apparatus configured as a system, each apparatus can be configured to share all or selected resources of the system, including: controller, sensors, interfaces. Example: an apparatus configured as a system of networked illuminated signs or illuminated general lighting devices can be controlled by a remote host controller using a single ambient light sensor. Same can apply to any sensors listed in this application.

Unless noted otherwise, for simplicity the network interface, such as wireless including INTERNET, is not shown on the drawings. An apparatus configured to contain multiple apparatuses each configured the same or differently is also referenced as a system. Apparatus configurable in compliance to local and national regulations for applications as intelligent illuminated: street address sign, street name sign; building sign, traffic sign.

FIG. 1 illustrates 3D view example of an apparatus (1) configured for illuminating street address with illumination devices backlighting from top of the sign toward bottom of the sign, as indicated by direction (24). Similar configuration of the apparatus can be used for illuminating street names. The illuminated components, such as: alpha characters; numeric characters; art; and combination of any of the above can be attached to the illuminated panel (2): front side; back side; or combination of both. The illuminated components, such as: alpha characters: numeric characters; art; and combination of any of the above can also be printed or silk-screened on a transparency, which is then placed in-front of the illuminated panel (2) front side. The apparatus components, including: controller; illumination devices (27); sensors; interfaces—are installed within the enclosure of the apparatus, and outside enclosure: wireless antenna as example. The enclosure of the apparatus can be designed and sealed to meet outdoor requirements, including compliance to ratings defined by NEMA and IP. Example of environmental rating: NEMA 4, IP66. The apparatus is designed to meet local and national agency requirements and regulations. Example: compliance to UL, NEC, local ordinances. The location of the components within the enclosure of the apparatus is selected to achieve: reliable operation; uniformed illumination of the illuminated panel from the illuminated device in the direction of illumination. Illuminated devices include LED's mounted along: standard PCB; flexible PCB; individually as discrete parts hardwired; and any combination of above. For the apparatus shown on FIG. 1 the illumination devices (27) are mounted along the interior top side of the enclosure, directing their illumination down toward the bottom side of the enclosure, as indicated by (24), with majority of the illumination flowing parallel to the back side of the illumination panel (2). The illuminating devices (27) can be configured as LED's installed on a flexible PCB with self-adhesive backing to allow the PCB to be attached along the inner surface of the enclosure, as shown by (27) on FIG. 1. Illuminating devices, including solid state devices, include LED's. LED's can be: color RGB; single color, and combination of both. Controller of the apparatus will provide controlled power to LED devices, and control the illumination parameters, including: light intensity; light flowing; color flowing when color LED's are used; light blinking at various frequencies. Controller will monitor sensors of the apparatus, including: ambient light; proximity; temperature; voltage; current. Controller will support functionality of sensor interfaces, including: wireless LAN, mobile. INTERNET; infra-red from operator remote; audio/voice to/from operator. The default configuration of the sensors of the apparatus will depend on application, and include: trigger points for self-diagnostics in respect to: ambient light; internal temperature; proximity, and associated controls for each trigger point. The default configuration of the controls of the apparatus will depend on application, and include: control algorithm during: normal operating environment; special events as indicated by the operator or remote controller; special conditions as indicated by status of the sensors of the apparatus. The default configuration of the controls of the apparatus will depend on application, and include: control algorithm for illuminating devices during: normal operating environment; special events as indicated by the operator or remote controller; special conditions as indicated by status of sensors. Configuration of controls of illuminating devices will include: minimum/maximum levels of illumination intensity; tables or functions of light intensity per sensor status. Configuration settings of the apparatus will be designed to comply with regulations and local ordinances, including: minimum/maximum illumination during normal operating conditions; minimum/maximum illumination during special operating conditions; maximum allowable power consumption limit; limits of color selections when color LED's are used. Configurations setting are stored: in controller non-volatile memory; non-volatile memory of a remote controller; or combination of both. The access to apparatus after installation, including changes to default configuration and real-time controls, such as: controls by operator; controls by remote controller—are designed with compliance to applicable regulations of local and national regulations. From this point forward, for simplicity, all references to configuration and controls are assumed to be in full compliance to applicable local and national regulations. The apparatus is an intelligent device, including self-diagnostics continuously running in the background, monitoring status of sensors and status of components of the apparatus to maximize longevity of the apparatus and sustain apparatus operations under various ambient environments as listed in product specifications. The default configurations, or selected portion of the default configuration, can be updated as needed, including after installation is complete. The update of the configuration of the apparatus can be accomplished by the operator using: remote controller, such as infra-red control pad; interface to ambient light sensor; interface to proximity sensor; voice commands. The update of the configuration of the apparatus can be accomplished by the remote controller, such as: remote host; mobile phone using wireless network, including INTERNET. The apparatus will acknowledge the status of the apparatus using: illuminating devices; dedicated status LED's; audio interface; wireless communications; and any combination of above. The status of the apparatus during configuration process by the operator includes: navigation of the operator of the next step during a configuration sequence; acknowledgement of a command executed. The status of the apparatus during configuration process by a remote controller includes: executing specific protocol exchange with the remote controller. The status of the apparatus during normal operating conditions includes: operation of the illumination devices according to configuration algorithm. The apparatus is an intelligent device. Part of the configuration can include time based activities, based on real-time clock of the apparatus controller or based on real-time clock provided by a remote controller. Controller of the apparatus will monitor applied voltage, and will detect a change when connected power sources switched from a regulated power supply to a battery, including conventional battery packs, or solar battery. When detected, the controller will execute algorithm to sustain operation as long as possible, while maintaining minimum applicable requirements. Example, the apparatus may exceed efficiency levels required by local ordinances, and can be operated at higher illumination while consuming less power. When a switchover to a battery is detected, the controller can switch algorithm to lower intensity to required minimum, and as result, extend or maximize use of power stored in the battery. In time, as needed, when requirements of local ordinances change, the apparatus configuration can accordingly be updated remotely via wireless interface to remote controller. As result, from the moment of the original installation, the apparatus is maintained within local regulations at all times. The controller of the apparatus can be configured to operate with a predefined margin from maximum allowable specifications on selected components, including illumination devices. Example, illumination device such as LED's, can have rating of 40 mA maximum at maximum rated ambient temperature. The controller of the apparatus can be configured to operate the LED's 20% below maximum ratings, as a safety margin. The manufacturers of LED's list longevity of the devices at 50,000 hours minimum. With 20% safety margin, and the fact that during day-time LED's will be turned OFF, the apparatus for applications as illuminated street address sign or street name sign can last 10+ years without maintenance. This is why ability to update configuration to meet latest local ordinances is an important feature to sustain the apparatus in compliance throughout its entire life time, projected at 10+ years of use. Sensors of the apparatus are located within the enclosure of the apparatus to allow these devices to operate within their specifications requirements. Wireless antenna, and other components, can be mounted externally to the enclosure of the apparatus. Apparatus using wireless interface can be interfaced with: other apparatuses; host controllers; other systems, including security; forming a network of intelligent devices operation of which can be coordinated by a global algorithm to provide required level of safety and security of a community by properly illuminating street address signs, street name signs and other signs based on apparatus, within the community. For apparatus configured without operator remote, the apparatus configuration can be accomplished by the operator using the ambient or proximity sensor. Example of a procedure allowing the operator using the ambient light sensor requesting configuration change of an apparatus:

1) Ambient light must be present at a level when the sign is OFF
2) Using an object to cover the light sensitivity window of the light sensor, prevent the light from reaching the sensor for at least 5 seconds
3) The apparatus via illumination devices will acknowledge the condition and will blink 3 times at a rate of about once per second (1 Hz), and then keep illumination ON
4) Following the procedure described in the manual, select the configuration parameters for adjustment. Example: 3 taps or triggers of closing/opening the sensor window at about once per second open/close will select the configuration parameter related to maximum illumination intensity. The apparatus will acknowledge the selection by blinking illumination devices prevent 3 times at a rate of about once per second (1 Hz), and then turn OFF the illumination
5) Operator can then with each tap on the sensor window increase illumination intensity one level per each trigger. The illumination devices will turn ON and controller of the apparatus will adjust the intensity one level per each trigger.
6) After no taps or triggers for at least 5 seconds, the controller will set the illumination intensity at the last selected level, and exit the configuration mode by blinking the lights one time and then staying ON at selected maximum intensity.

Similar procedure can be applied to proximity sensor.

Blocking the ambient light sensor with an object during presence of ambient light, as described in the instructions manual, reduces the sensor light reporting level to its lowest trigger point, equal to condition where is no ambient light. Removing the light blocking object will return the sensor light reporting level to represent presence of ambient light. This drastic change of light condition, in practical terms, can only happen when a light blocking object is present and then removed during daytime ambient light.

The sequence of locking the ambient light sensor with an object during presence of ambient light for continuous period of time, example 10 seconds, and then removing the object allowing ambient light to reach the sensor, followed with no further blocking of the light for a specified period of time, example 10 seconds, can be selected to reset the configuration of the apparatus to its default factory setting.

Control algorithm of the apparatus is based on:
1) Trigger points of sensors
2) Controls received from operator remote, when available 3) Controls received from remote controller over wireless interface
4) Controller self-diagnostics
5) Preset time-based controls
6) Combination of any of the conditions described above Control algorithm of the apparatus includes automatic controls of illumination parameters based on:
1) Status of a sensor
2) Trigger point of a sensor
3) Operator command
4) Remote controller command
5) Preset time-based controls
6) Any combination of above Illumination parameters available for control include:
1) Light intensity, including ON and OFF state
2) Light color selection, sequencing
3) Light blinking
4) Combination of any of the above The objective of control algorithm includes:
1) Compliance to regulations, including local ordinances. Example: limit on maximum power consumption; limit on maximum power consumption per set period of time (24 hours, as example); limits on minimum and maximum illumination intensity; turning ON and OFF based on status of ambient light turning ON and OFF based on time of the day; operation during power outage, including sustaining battery operation; battery regulations, including solar.
2) Sustaining operation of the apparatus within apparatus specification parameters Sensor status includes:
1) Operational
2) Failed Sensor trigger points for ambient light sensor include various levels of ambient light, primarily: day light; evening light; night light; no light (sensor blocked).

Sensor trigger points for proximity sensor include various levels of object being detected: detected close range; detected middle range; detected long range; not detected.

Sensor trigger points for temperature sensor include various levels of temperatures: below low; low; normal; high; very high.

The control algorithm as function of temperature trigger points includes:
1) When "below low"—keep illumination ON at maximum intensity ("warm up" cycle) for specified period of period of time (60 seconds as example), and if still "below low"—turn OFF illumination. Repeat the "warm-up" process few minutes later.
2) When illumination is required and "very high" is detected—turn OFF illumination ("cool-down" cycle) for specified period of period of time (60 seconds as example), and if still "very high"—turn OFF illumination. Repeat the test and "cool-down" process few minutes later.
3) When illumination is required and "high" is detected—reduce illumination to minimum level ("low-down" cycle) for specified period of period of time (30 seconds as example), and if still "high"—repeat the test and "low-down" process few minutes later.
4) When illumination is not required and "high" is detected—execute emergency state illumination (blinking, colors if available) for specified period of period of time (30 seconds as example), and if still "high"—continue as long as below "very high" trigger point.

Control algorithm includes apparatus providing status updates to remote controller, and informing operator via illumination devices, and other user interfaces available. When RGB LED's are used, control algorithm will take into account voltage drops across each color LED, which can be different for each color. To conserve energy, the control algorithm can lower the power applied to LED's, and as result, use only color LED's with minimum voltage drop across maintaining maximum light while conserving energy. Control algorithm will include blinking lights (PWM controls, as example) at frequency not detectable by a human eye, which will also allow to lower consumption of energy by apparatus. Control algorithm includes turning ON illumination devices, including LED's, when the ambient temperature falls below predefined level, and using illumination devices for generating self-heating of the interior area of the apparatus, extending operation of the apparatus at low temperatures. The control algorithm ensures the apparatus is operating within the apparatus specification parameters at all times. The acceptable operating criteria for the apparatus and the control algorithm to achieve the acceptable operating criteria are stored in the non-volatile memory of the apparatus. The designated sections of the enclosure of the apparatus can be configured to let the light generated by the illumination devices to also illuminate the area surrounding the apparatus. For example, for the apparatus shown on FIG. 1, the direction of the light (24) generated by LED's (27) is toward the bottom side of the apparatus. To maximize the use of the light generated by LED's (27), the bottom section of the enclosure of the apparatus can be configured to let the light penetrate through its surface and illuminate the area underneath the apparatus, providing general illumination of the area, further contributing in improving environmental safety. The apparatus is configurable in compliance to local and national regulations for applications as intelligent illuminated: street address sign, street name sign; building sign, traffic sign.

Figure 2:
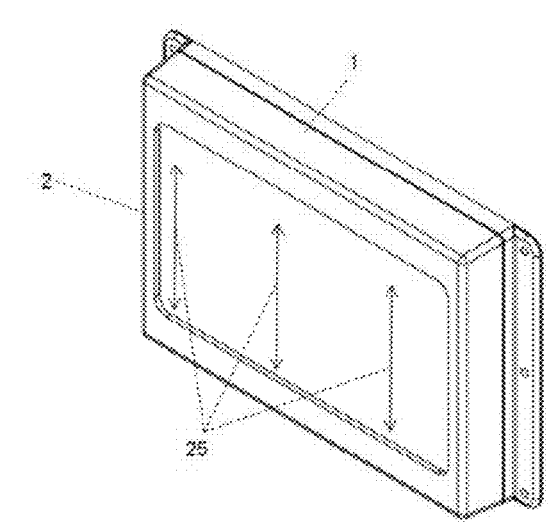
FIG. 2: 3D view example of an apparatus configured for illuminating street address with illumination devices back-lighting from top and bottom of the sign.

FIG. 2 illustrates 3D view of the apparatus (1) configured with illumination devices located at the top of the enclosure of the apparatus, as shown by (27) on FIG. 1, and illumination devices located at the bottom of the enclosure, opposite to the ones located on the top. As result, the illumination of the illuminated panel (2) runs vertically in both directions: top-to-bottom, and bottom-to-top. The controller of the apparatus can control illumination devices, applying a common algorithm to both illumination devices located on the top and at the bottom, or use separate algorithm for the top, and separate for the bottom.

Figure 3:
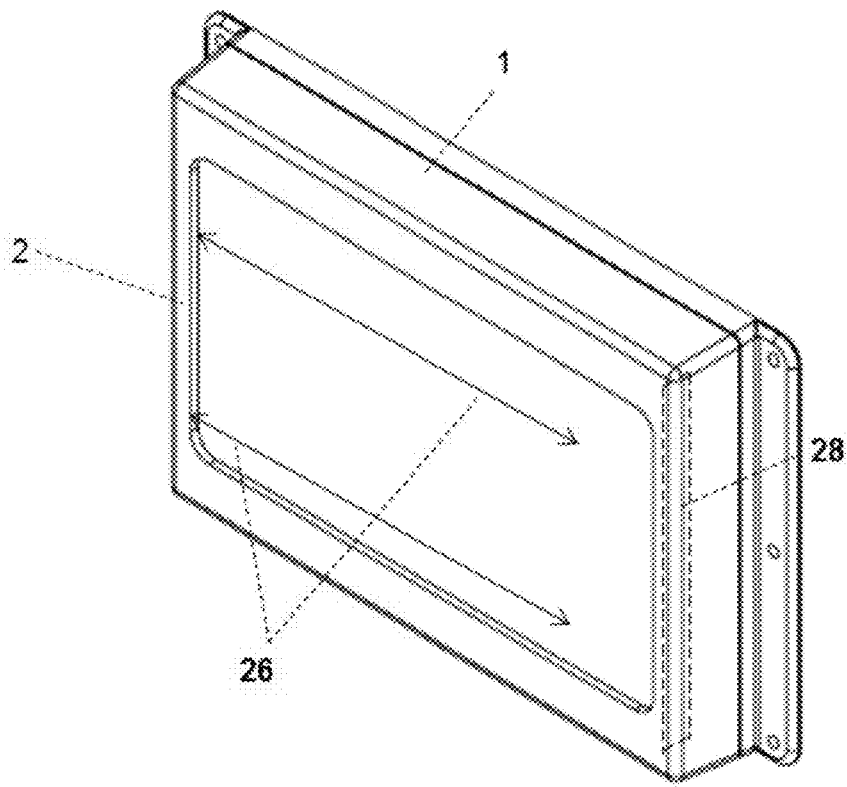
FIG. 3: 3D view example of an apparatus configured for illuminating street address with illumination devices back-lighting from both left and right sides of the sign.

FIG. 3 illustrates 3D view of the apparatus (1) with illumination devices located on the left side (not shown for simplicity) and on the right side (28) of the enclosure of the apparatus.

As result, the illumination of the illuminated panel (2) runs horizontally in both directions: left-to-right, and right-to-left. The controller of the apparatus can control illumination devices, applying a common algorithm to both illumination devices located on the left and on the right, or use separate algorithm for the left, and separate for the right. Apparatus can be configured with illumination running parallel to the illumination panel, along the back side of the illumination panel in any direction.

Figure 4:
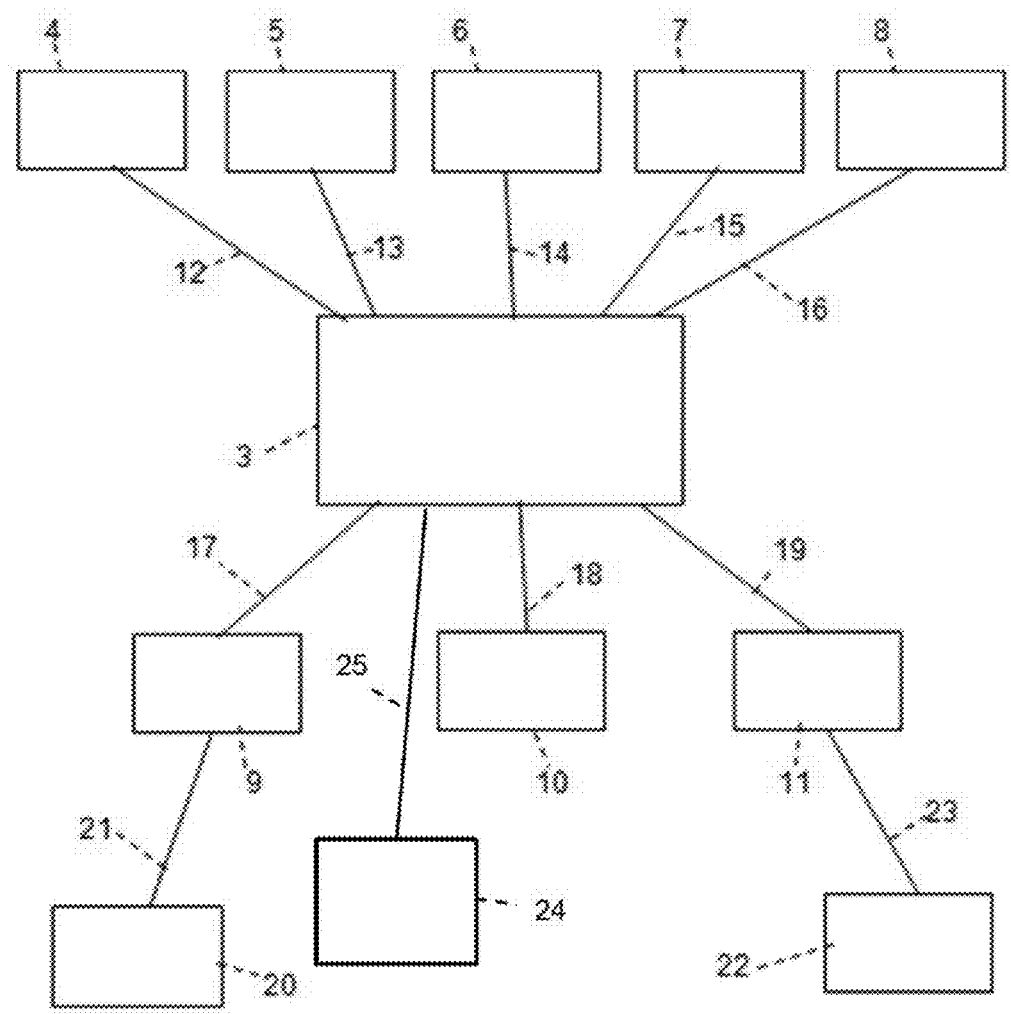
FIG. 4: Diagram of an apparatus illustrating major components and interfaces.

FIG. 4 illustrates the interfaces between various components of the apparatus. The interfaces include: wired interfaces through PCB, and harnesses; wireless interfaces, including INTERNET. Components are labeled as follows:
3—Controller of the apparatus. Example: embedded controller with integrated temperature sensor, analog and digital input-outputs, and low power consumption during "sleep" mode.

4—Sensor of the apparatus for ambient light, which is interfaced to controller via control interface (12).

5—Sensor of the apparatus for proximity, interfaced to controller via control interface (13)

6—Sensor of the apparatus for internal temperature, interfaced to controller via control interface (14)

7—Sensor of the apparatus for voltage, interfaced to controller via control interface (15). Monitored voltage can include: voltage supplied by power source; voltage applied to illumination devices.

8—Sensor of the apparatus for current, interfaced to controller via control interface (16). Monitored currents can include: current consumed from applied power source; current consumed by illumination devices.

9—Infra-red control interface circuits and components of the apparatus for interfacing to operator infra-red remote controller (20). Infra-red controls (9) are interfaced to controller (3) via control interface (17), and then to the remote infra-red controller (20) via infra-red interface (21).

10—Audio interface of the apparatus for operator, which is connected to controller (3) via control interface (18). Audio interface can include: audio announcements controlled by controller (3); audio microphone for accepting audio commands from operator.

11—Wireless interface of the apparatus connected to controller (3) via control interface (19). Wireless interface (11) is used for connecting the apparatus to external devices, including: remote controller, operator remote, mobile devices. Wireless connections include: LAN, INTERNET.

24—Intelligent power source of the apparatus connected to controller (3) via interface ((25). The power source can be configured as a power splitter, and the power splitter will ensure that at least one power source, such as battery, will sustain operation of the apparatus when other power sources have failed. The controller (3) of the apparatus will monitor status of the power source (24), and execute controls, including controls of the power source (24) to ensure the apparatus is operational during a power outage.

Figure 5:
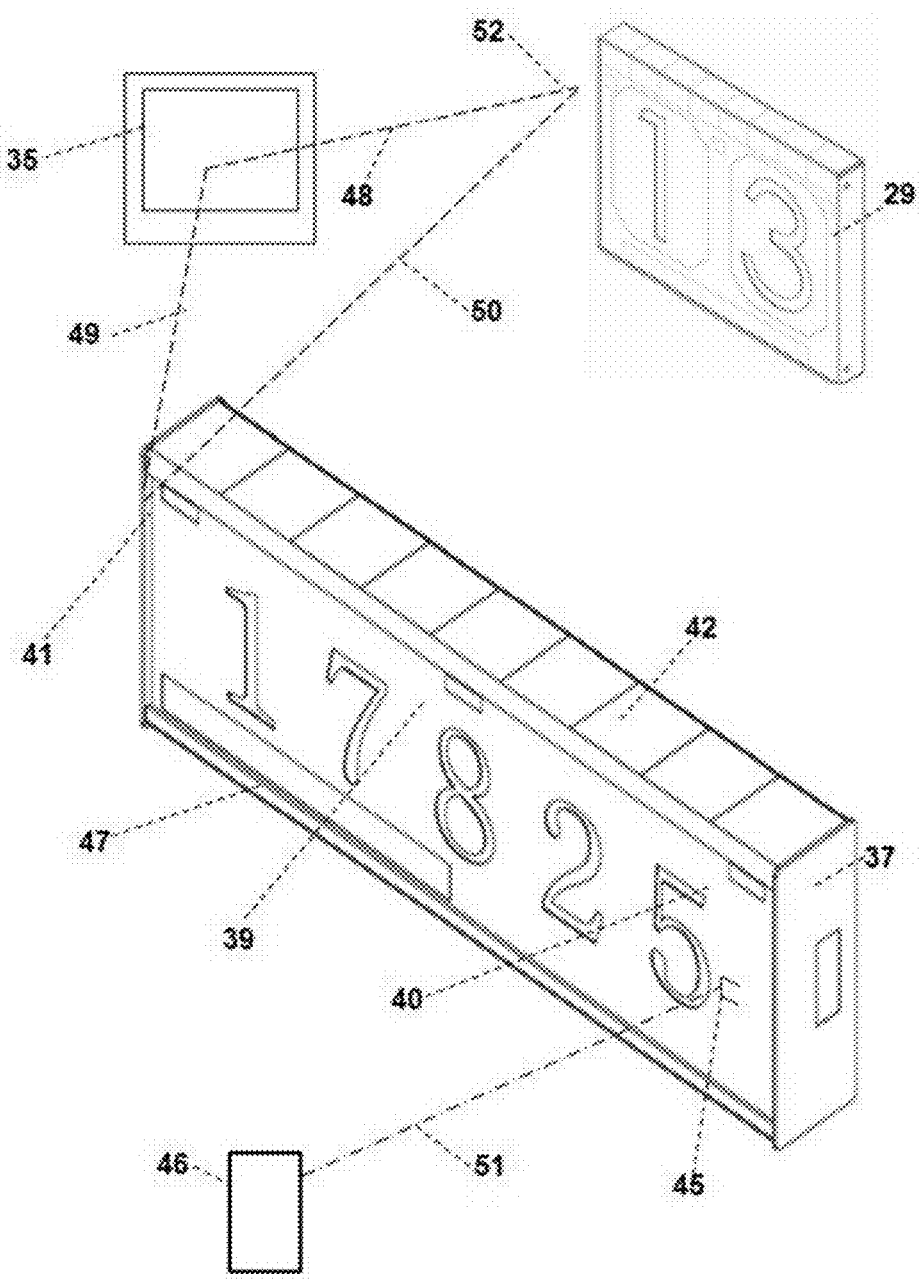
FIG. 5: Example of an apparatus configuration as a system.

FIG. 5 illustrates an example of an apparatus configured as a system consisting of: remote controller (35); apparatus (29) configured as two character street address illuminated sign with number "13"; apparatus (37) configured as five character street address illuminated sign with number "17825". Location of components for apparatus (29) and (35) are shown for illustration purposes only. Apparatus (29) can be configured with features described for apparatus (37). The controller of each apparatus is residing inside the enclosure. Apparatus as illustrated on this drawing is configured as an intelligent device.

Apparatus can be also configured with only hardware presets, including: potentiometer or fixed resistors setting trigger points for sensors installed into apparatus, including: ambient light sensor; proximity sensor.

Based on hardware preset sensor trigger points, the apparatus hardware can be configured to control application of power to illumination devices, including turning power OFF when illumination is not needed, and ON when it is required. Additional current limiting hardware devices, including resistors, can be used to limit amount of power applied to illumination devices.

Other components are labeled as follows:

39—Ambient light sensor of (37). The controller of the apparatus is connected to sensors and interface components. The controller of the apparatus can be configured to store in its non-volatile memory trigger points for sensors, which can be set for each sensor. Trigger points for ambient light sensor include different levels of ambient light. Configuration of the apparatus includes control algorithm associated with each trigger point of a sensor. Control algorithm based on ambient light sensor includes: adjusting power to illumination devices per set trigger points of the ambient light sensor, including turning the power OFF when there is sufficient level of ambient light. Configuration algorithm can enable operator to use the ambient light sensor to configure the apparatus, and select or set specific trigger points for each sensor, including ambient light sensor. Operator can use ambient light sensor, and by blocking the sensor light sensing window with an object preventing the sensor "seeing the light", i.e. creating "dark" state, and as result triggering the respective preset limit. By blocking the sensing window of the ambient light sensor preventing the ambient light reaching the sensor, the operator can trigger the status of the ambient light sensor between two states: state 1—ambient light present at a level above preset minimum level; state 2—ambient light is not present, or is below the preset minimum level limit. By triggering these states at predefined sequences, operator can execute commands related to apparatus: configurations and controls.

40—Trigger points for proximity sensor include different distances of a detectable object from the apparatus. Sensor trigger points for proximity sensor include various levels of object being detected: detected close range; detected middle range; detected long range; not detected. Operator configuration features described for ambient light sensor (39) can be similarly implemented for the proximity sensor.

41—Wireless device of apparatus (37), which can be configured to support wireless communications over required distances, including INTERNET. The wireless interface and communication protocol can be configured to industry standards, including compliance or compatibility with wireless security systems.

42—Solar battery. The configuration of the apparatus (37) can include solar battery as the main power source, or as a backup power source. The location of the solar battery can be remote from the enclosure of the apparatus, with respective power connection between the solar battery and electronics within the enclosure of the apparatus.

45—Infra-red sensor of the (37) to interface with Infra-red remote controller (46). The infra-red interface (51) is orientation and distance sensitive. The controller (46) can be configured to operate from a range of distances, example 0-10 meters, and an angular window positioning in respect to (45) of 0-30 degrees.

46—Infra-red controller, which can include a number of control buttons enabling an operator to execute a number of controls. Example of controls: illumination ON/OFF; illumination intensity; illumination colors; illumination dynamic effects, such as blinking, rolling colors; setting configuration parameters related to sensors, including ambient light, proximity; setting configuration parameters related to time-based events, including maximum duration of illumination power staying ON.

47—Area of the sign (37) which can be configured for illumination independent of the illumination associated with illumination of the street address number '17825'.

48—Wireless interface between controller (35) and the sign (29)

49—Wireless interface between controller (35) and the sign (37)

50—Wireless interface between the sign (29) and the sign (37). This interface can be used for individual signs, when enabled by remote controller (35) or as set by control algorithm for the system, to communicate directly. The communication can include status notification.

Figure 6:
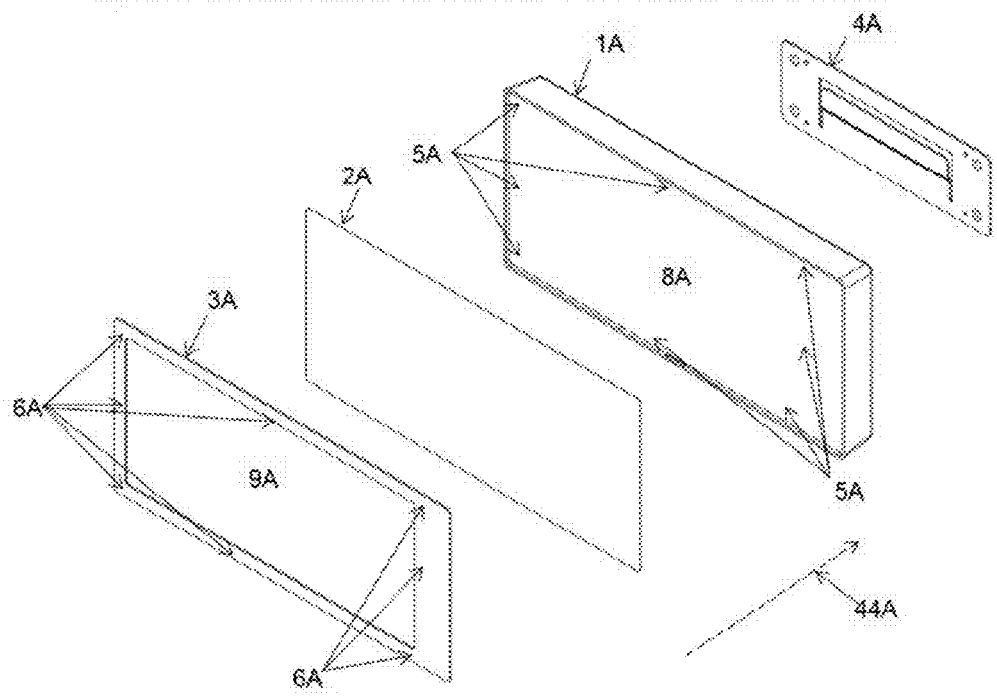
FIG. 6: 3D view of major components of an apparatus configured for illuminated sign with hidden magnets along the inner perimeter of the illuminated area, and using faceplate with magnets to secure the position of a blank sign sheet located in-between the illuminated area of the sign and the faceplate.

FIG. 6 illustrates a 3D assembly drawing of an apparatus configured for illuminated sign, which is further configured to be attached to a flat surface, such as surface of a building, including residential housings, via Mounting Bracket (4A). The drawing illustrates the major components of the Sign being assembled in the direction (44A). The illumination of the Illuminated Panel (8A) of the Sign is provided by LED's installed inside the Enclosure (1A) of the Sign, and more specifically along the perimeter of selected sides of the Enclosure (1A), shining their light in-parallel to the inner surface of the Illuminated Panel (8A), or under a slight angle toward the inner surface of the Illuminated Panel (8A). The Sign is configured with Magnets (5A) installed along the inner perimeter of the Illuminated Panel (8A). Eight Magnets (5A) are shown, as an example. Magnets (5A) magnetic properties or specifications, including: shape; size; weight; and the selection of Magnets (5A) location along the perimeter of the Panel (8A) are configured to provide sufficient force distributed along the Panel (8A) to hold accessories of the Sign to be attached to the face surface of the Panel (8A) of the Sign to be assembled in the direction (44A). The accessories include: a Sign Sheet (2A), shown as blank without any symbols, and the Faceplate (3A).

The FIG. 6 component labels and further details:
(2A) Sign Sheet, such as a transparency, configured to fit within the designed area of Illuminated Panel (8A). For this particular configuration of the Sign, the Symbols such as a street address numbers, can be attached to the Sign Sheet (2A) by means of: gluing, printing, writing by hand. The Sign Sheet (2A) are easy to install and replace. The Sign Sheet (2A) is held against the Illuminated Panel (8A) by being "sandwiched" in-between the Faceplate (3A) and the Illuminated Panel (8A) as result of respective Magnets (5A) of (8A) and (6A) of (3A) creating force to hold all three components together. The Sign Sheet prior to installation is easy to align, using the slight cavity of the Enclosure (1A) specifically configured for the purpose of aligning the Sign Sheet (2A) and the Faceplate (3A) in respect to the Enclosure (1A).
(3A) Faceplate with eight Magnets (6A) installed on the surface facing the Enclosure (1A) of the Sign. The eight Magnets (6A) are configured to mate with respective Magnets (5A) of the Illuminated Panel (8A): when the Faceplate (3A) is within a near proximity from the Panel (8A) the Magnets (5A) of the (8A) will attract the respective Magnets (6A) of the (3A), and will allow to fasten the (3A) to (8A). The outline of the Enclosure (1A) is configured to guide in the aligning of the (3A) in respect to (8A).
(8A) Opening in the Faceplate configured to form the area illuminated by the Panel (8A) and designed for illuminating Symbols (characters, art, etc.) within the are outlined by (9A). The configuration of
(9A) can be made to cover specific sections of Illuminated Panel (8A), including sections which have insufficient illumination level.

Figure 7:
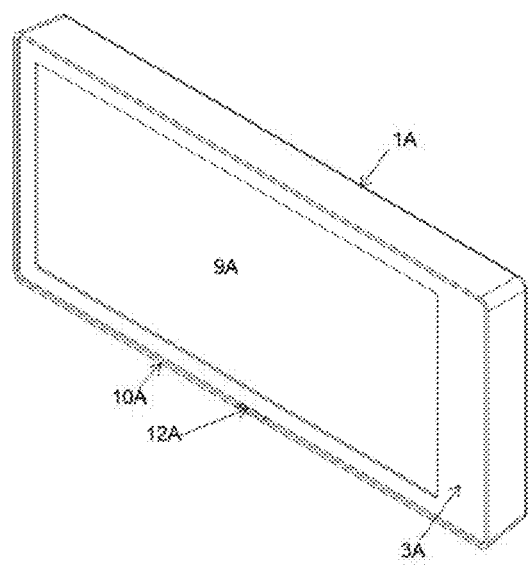
FIG. 7: 3D view of an assembled apparatus configured for illuminated sign with a blank sign sheet secured by a faceplate with magnets fastened to the respective magnets of the illuminated area of the sign.

FIG. 7 illustrates a 3D assembled apparatus configured for illuminated sign (10A) illustrated on FIG. 6. The (12A) represents a small slot in the Enclosure (1A) which is configured for a small flat object, such as a flat screw driver, to lightly separate the Faceplate (3A) Magnets (6A) from their respective magnets (A) of (1A) at the bottom section of the Sign (10A). The use of magnets simplifies the process of removal of the Faceplate (3A) from the Enclosure (1A). A replaceable Sign Sheet (2A) shown on FIG. 6, will be placed in-between the Faceplate (3A) and the Enclosure (1), in front of the illuminated Panel (9A). The Sign Sheet (2A) is like "sandwiched", and its position is maintained by respective Magnets (6A) of the Faceplate (3A) and respective Magnets (5A) of the Enclosure (1A).

Figure 8:
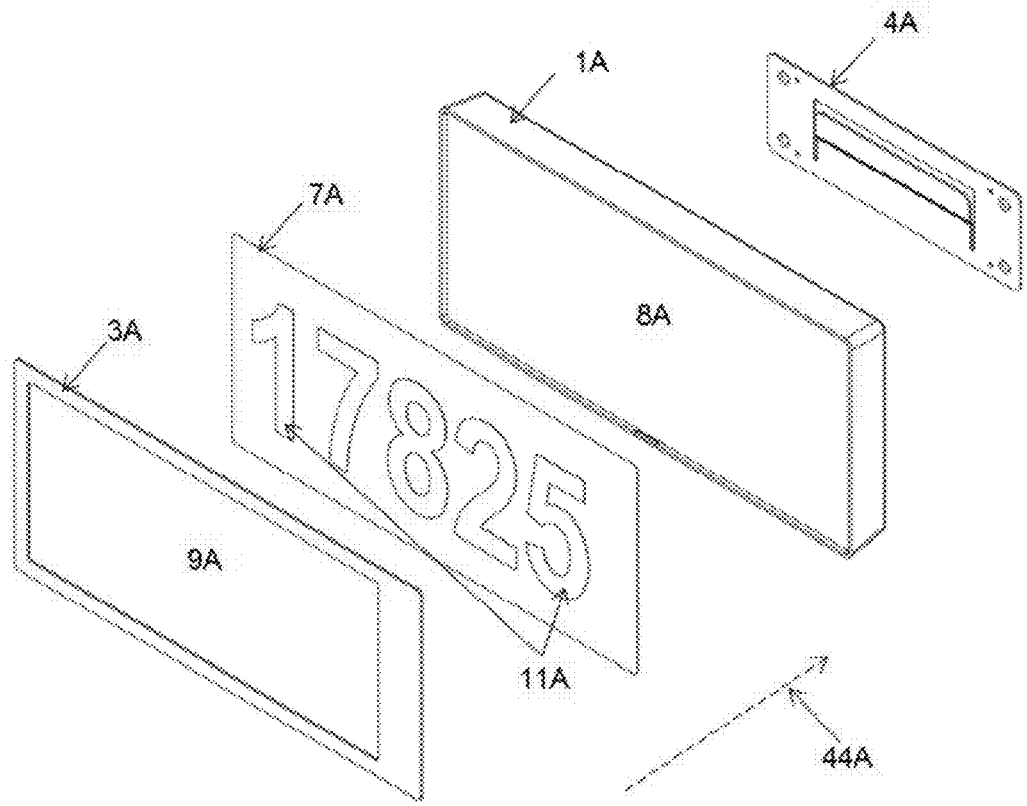
FIG. 8: 3D view of major components of an apparatus configured for an illuminated sign with hidden magnets along the inner perimeter of the illuminated area, and using faceplate with magnets to secure the position of a sign sheet with numbers "17825" as an example, and the sign sheet located in-between the illuminated area of the sign and the faceplate.

FIG. 8 illustrates a 3D assembly drawing of an apparatus configured for illuminated sign, which is further configured to be attached to a flat surface, such as surface of a building, including residential housings, via Mounting Bracket (4A). The drawing is similar to FIG. 6 with the exception that the Sign Sheet (7A) has Symbols (11A) configured as numbers, and which can represent a street address number '17825', as shown. The numbers '17825' can be attached to the Sign Sheet (7A) by means of: gluing, printing, or writing by hand. Other components are labeled same as on FIG. 6. Additional Symbols, such as combination of characters, art can be added or embedded to the Sign Sheet (7A).

Figure 9:
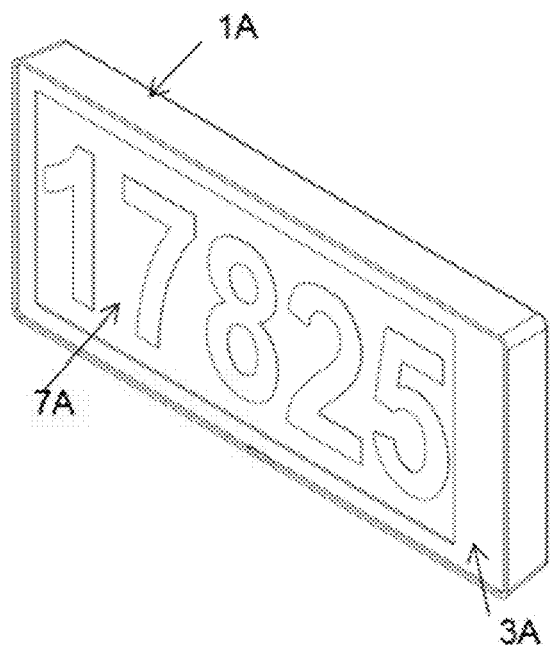
FIG. 9: 3D view of an assembled an apparatus configured for illuminated sign with a sign sheet '17825' as an example secured by a faceplate with magnets fastened to the respective magnets of the illuminated area of the sign.

FIG. 9 illustrates a 3D assembled apparatus configured for illuminated sign illustrated on FIG. 8. Components are labeled same as on FIG. 8

FIG. 10 illustrates a 3D assembly drawing of an apparatus configured for illuminated sign, which is further configured to be attached to a flat surface, such as surface of a building, including residential housings, via Mounting Bracket (4A). The drawing illustrates the major components of the Sign being assembled in the direction (44A). The illumination of the front Illuminated Panel (8A) of the Sign is provided by LED's installed inside the Enclosure (32A) of the Sign, and more specifically along the perimeter of selected sides of the Enclosure (32A), shining their light in-parallel to the inner surface of the Illuminated Panel (8A), or under a slight angle toward the inner surface of the Illuminated Panel (8A). The Sign is configured with Magnets (36A) through (40A) installed in locations as shown, which are configured to allow placement of five numbers: '1' labeled as (15A), '7' labeled (16A). '8' labeled as (17A), '2' labeled as (18A) and '5' labeled as (19A) with each number being configured with material magnetically attractive, such as metal, or have separate Magnets attached on each number facing the respective Magnets labeled (36A) through (40A) of the Panel (8A). For simplicity, not all labels are shown. (24A) is indicating the direction of each number (15A) through (19A) to be magnetically attached to respective locations on the Panel (8A). Other components are labeled same as on FIG. 6.

FIG. 11 illustrates a 3D of five numbers shown on FIG. 10: '1' labeled as (15A), '7' labeled (16A), '8' labeled as (17A). '2' labeled as (18A) and '5' labeled as (19A) with each number being configured with material magnetically attractive, such as metal, or have separate Magnets labeled (26A) through (30A) attached on the back of each number. For simplicity, not all labels are shown. (22A) is indicating the direction of each number (15A) through (19A) to be magnetically attached to respective locations on an Illuminated Panel of a Sign.

FIG. 12 illustrates a 3D assembled of an apparatus configured for illuminated sign illustrated on FIG. 10. Components are labeled same as on FIG. 10.

Figure 13:
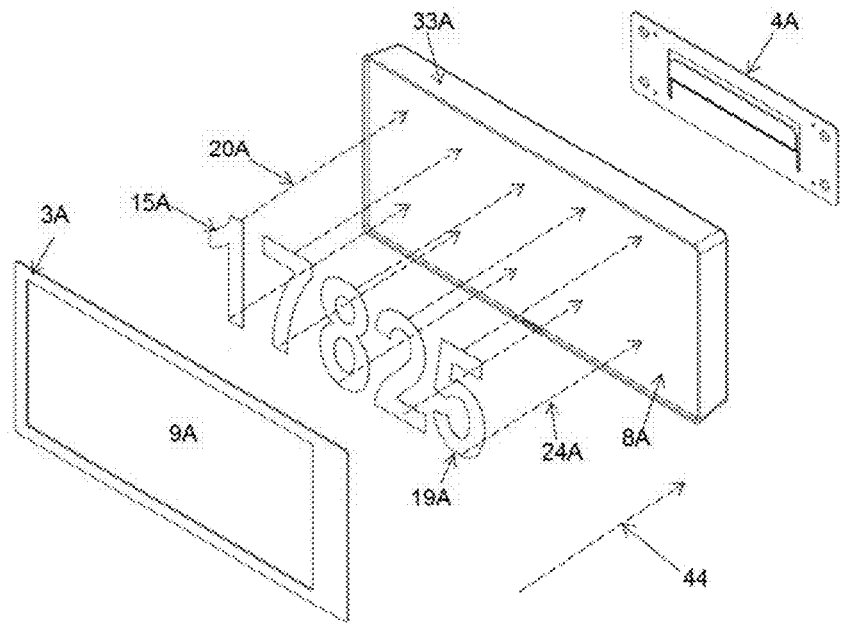
FIG. 13: 3D view of major components of an apparatus configured for illuminated sign using numbers '17825' as an example with each number being glued directly to the surface of the illuminated area with a weather-proof adhesive. Faceplate is optional.

FIG. 13 illustrates a 3D assembly drawing of an apparatus configured for illuminated sign, which is further configured to be attached to a flat surface, such as surface of a building, including residential housings, via Mounting Bracket (4A). The drawing illustrates the major components of the Sign being assembled in the direction (44A). The illumination of the front Illuminated Panel (8A) of the Sign is provided by LED's installed inside the Enclosure (33A) of the Sign, and more specifically along the perimeter of selected sides of the Enclosure (33A), shining their light in-parallel to the inner surface of the Illuminated Panel (8A), or under a slight angle toward the inner surface of the Illuminated Panel (8A). The Sign is configured to allow gluing of Symbols to the Illuminated Panel (8A). As shown for example, five numbers: '1' labeled as (15A), '7' labeled (16A), '8' labeled as (17A), '2' labeled as (18A) and '5' labeled as (19A) with each number being configured with self-adhesive backing can be attached directly to Panel (8A). For simplicity, not all labels are shown. (24A) is indicating the direction of each number (15A) through (19A) to be adhered to respective locations on the Panel (8A). Adhesive materials are configured to specification requirements, including ambient. Other components are labeled same as on FIG. 10.

Figure 14:
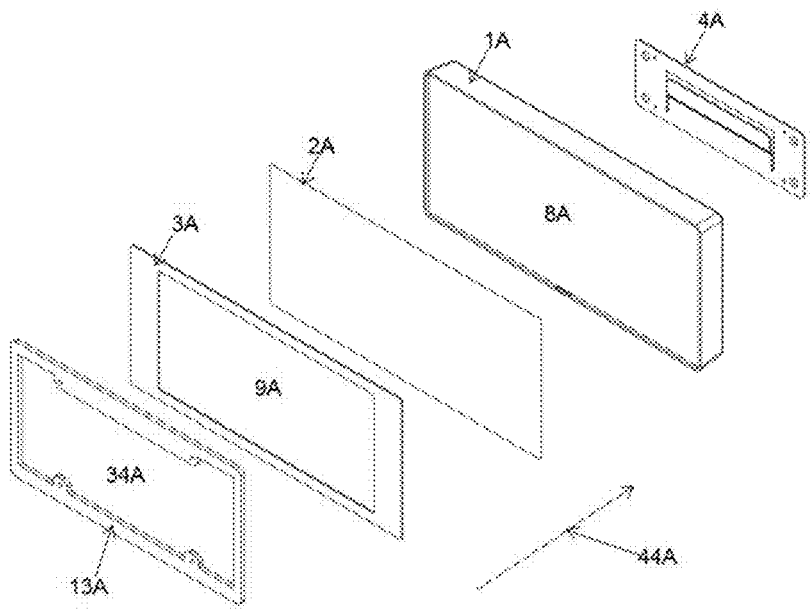
FIG. 14: 3D view of major components of an apparatus configured for illuminated sign which is configured with three decorative items, including: car license plate frame, faceplate, blank sign sheet, with the frame and faceplate attached to the sign by magnets, and the blank sign sheet "sandwiched" between the faceplate and the illuminated area of the sign.

FIG. 14 illustrates a 3D assembly drawing of an apparatus configured for illuminated sign, which is further configured to be attached to a flat surface, such as surface of a building, including residential housings, via Mounting Bracket (4A). The drawing illustrates the major components of the Sign being assembled in the direction (44A). The illumination of the front Illuminated Panel (8A) of the Sign is provided by LED's installed inside the Enclosure (1A) of the Sign, and more specifically along the perimeter of selected sides of the Enclosure (1A), shining their light in-parallel to the inner surface of the Illuminated Panel (8A), or under a slight angle toward the inner surface of the Illuminated Panel (8A). The Sign can be configured to allow placement of the Sign Sheet (2A) as illustrated on FIG. 6. The unique feature of this Sign illustrated here is that it can be configured with additional component (13A), such as a standard license plate Frame (13A). The Sign can be configured with Magnets, as illustrated on previous FIGS and described above, with respective Magnets attaching all components (3A), (13A) to the Panel (8A) of the Enclosure (1A).

Below is a list of few possible configurations.
Configuration 1:
 a) Panel (8A) with Magnets (5A) behind the panel as shown on FIG. 6
 b) Faceplate (3A) made out of metal, configured of being attracted by Magnets (5A)
 c) Frame (13A) with Magnets similar to (6A) as shown on FIG. 6 and installed on the side of (13A) facing the Sign, and matching location of Magnets (5A) of the Panel (8A)

When all components (2A), (3A) and (13A) are aligned in respect to Panel (8A)—all will be held in place attached to the Panel (8A) by respective Magnets (5A) of the (8A) and Magnets (6A) of the (13A)
Configuration 2:
 a) Panel (8A) with Magnets (5A) behind the panel as shown on FIG. 6
 b) Faceplate (3A) with Magnets (6A) on the side of (3A) facing the Sign, as shown on FIG. 6
 c) Frame (13A) made out of metal, configured of being attracted by Magnets (6A) of the Faceplate (3A)

When all components (2A), (3A) and (13A) are aligned in respect to Panel (8A)—all will be held in place attached to the Panel (8A) by respective Magnets (5A) of the (8A) and Magnets (6A) of the (3A)

Figure 15:
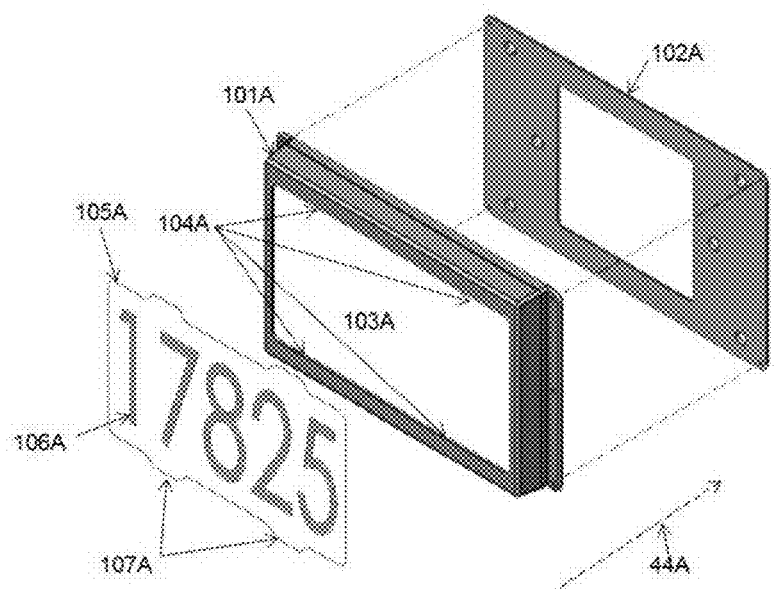
FIG. 15: 3D view of major components of an apparatus configured for illuminated sign with hidden pockets along the perimeter of the illuminated area, which are configured to accept tabs of a sign sheet, and a sign sheet with number "17825" as an example configured with tabs to be inserted into the pockets and secure the sign sheet in front of the illuminated area of the sign.

FIG. 15 illustrates a 3D assembly drawing of an apparatus configured for illuminated sign, which is further configured to be attached to a flat surface, such as surface of a building, including residential housings, via Mounting Bracket (102A). The drawing illustrates the major components of the Sign being assembled in the direction (44A). The illumination of the front Illuminated Panel (103A) of the Sign is provided by LED's installed inside the Enclosure (101A) of the Sign, and more specifically along the perimeter of selected sides of the Enclosure (101A), shining their light in-parallel to the inner surface of the Illuminated Panel (103A), or under a slight angle toward the inner surface of the Illuminated Panel (103A). The Sign is further configured with Pockets (104A), four shown as example, which are configured to accept respective Tabs (107A) from a Sign Sheet (105A) to allow placement of the Sign Sheet (105A) on the top of the Illuminated Panel (103A) and securing the Sheet (105A) position in place in respect to Panel (103A). The Sign Sheet (105A) is shown with numbers '17825' (106A), which can be attached or embedded to the Sign Sheet (105A) by means of: adhesive, printing, writing by hand. The Pockets (104A) can be configured to retain the Sign (105A) during ambient environment listed in the sign specifications. For outdoor installations, and as needed, the Symbols (106A) can be printed on the back side of the Sign Sheet (105A), and the front surface of the Sign Sheet (105A) protecting the Symbols (106A) from direct contact with the ambient environment. The numbers (105A) are example, and can be configured to represent a street address number, Additional Symbols, such as combination of characters, art can be added or embedded to the Sign Sheet (105A). The process of placing Symbol (106A) onto the Sign Sheet (105A) includes: printing, silk-screening, painting.

Figure 16:
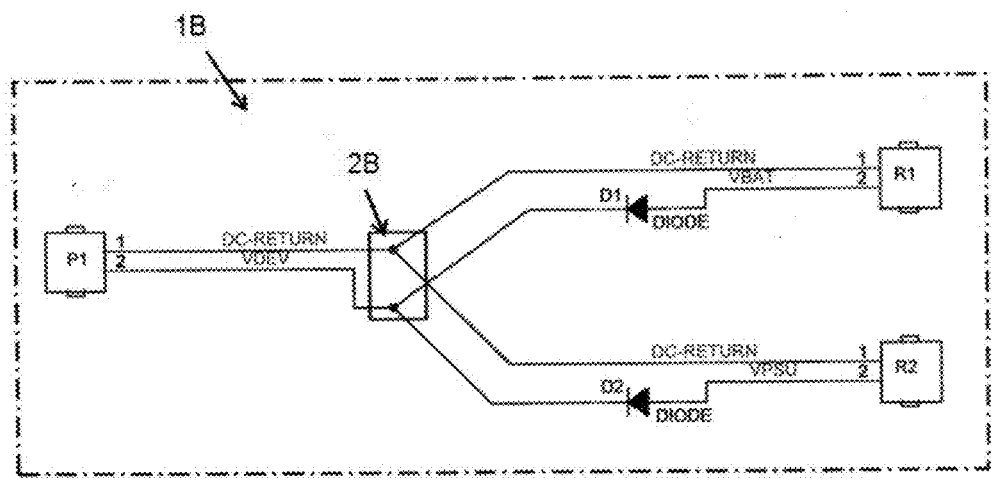
FIG. 16: Wiring Diagram of a power source of an apparatus, with the power source configured as a harness providing 2 independent power sources feeding 1 power device.

FIG. 16 illustrates wiring diagram of a power source of the apparatus, which is configured as a flexible harness (1B) with 2 female receptacles labeled R1 and R2 configured for accepting 2 independent DC power sources, and one male plug P1 configured for connecting a power load. The selection of all components will ensure when power supply is connected to R2 it will provide the power to the load connected to P1, regardless if the battery supply is connected or not to R1. When the power supply connected to R2 is not available (failed, or no main VAC electricity applied to the power supply), the battery supply connected to R1 will provide power to load connected to P1. Additional control components (not shown for simplicity) can be added to the harness (1) to ensure protection of each device connected to (1B) according to device specifications, example: over-voltage, under-voltage, shorts, excessive current, over temperature. The control components can include sensors monitoring the status of parameters such as: voltage, current, temperature, and sending signals to embedded control device inside (1B), which will execute a pre-defined algorithm to prevent conditions from exceeding set operating criteria for the harness (1B), including: overheating any device within (1B) or connected to (1B). The external interfaces of the power source of the apparatus described in the application, include configuration which is in full compliance with my concept of Plug and Power Distribution Systems described in U.S. Pat. No. 8,341,837 title "Modular Power Distribution and Control System", and in the patent pending application number U.S. Ser. No. 13/731,103 title "Plug and Power Distribution and Control Apparatus". For reference, the power source of the apparatus was described in details in a provisional application number U.S. 61/859,723 title "Apparatus DC Power Splitter to a Device from Several Power Sources with Controls", which has expired (my mistake) just few days ago.

Figure elements are labeled as follows:
R1—Power receptacle configured to accept a mating connector from a DC power source #1, such as battery. For 12V applications. R1 receptacle can be configured as an industry standard DC power receptacle 5.5 mm inside diameter barrel with 2.1 mm pin, and connected or soldered directly to harness (1B). Pin 1 of the R1 is labeled "DC-RETURN", as it will conduct current returning back to the power supply connected to R1 when in use. Pin 2 of the R1 is labeled "VBAT", as it will conduct current coming from the power supply, such as battery, connected to R1 when in use. For 12 VDC configuration: "VBAT" can be configured from +9 VDC to 12 VDC, as example. "DC-RETURN" would be 0 VDC.

R2—Power receptacle R2 configured to accept a mating connector from a DC power source #2. For 12V applications, R2 receptacle can be configured as an industry standard DC power receptacle 5.5 mm inside diameter barrel with 2.1 mm pin, and connected or soldered directly to harness (1B) As needed, R2 can be configured differently from R1, to prevent DC power source #1 from being connected to R2, and wise-versa. Pin 1 of the R2 is labeled "DC-RETURN", as it will conduct current returning back to the power supply connected to R2 when in use. Pin 2 of the R2 is labeled "VPSU", as it will conduct current coming from the power supply connected to R2 when in use. For 12 VDC configuration: "VPSU" will be regulated to +12 VDC±5%, as example. "DC-RETURN" would be 0 VDC.

P1—Power plug P1 configured to accept a mating connector from a DC power load, and connected or soldered directly to harness (1B). For 12V applications, P1 plug can be configured as an industry standard DC power plug with 2.1 mm inside diameter and 5.5 mm outside diameter barrel. Pin 1 of the P1 is labeled "DC-RETURN", as it will conduct current returning back to the active power supply connected to either R1 or R2. Pin 2 of the P1 is labeled "VDEV", as the positive voltage applied to the load connected to P1 and conduct current coming from the active power supply, either battery connected to R1, or power supply connected to R2.

2B—Junction section of the harness (1B), which is configured for interfacing 2 power supplies to a single power load. The connections between various signals are made between power lines from power supplies connected to R1 and R2, and then to the load connected to P1. In a harness (1B) configuration, these connections can be made by soldering respective wires, and isolating the leads with industry standard methods, including use of heat-shrining isolation tubing.

D1—Diode component installed into line labeled "VBAT", which is rated for voltage and current to prevent the current flowing into pin 2 of the R1.

D2—Diode component installed into line labeled "VPSU", which is rated for voltage and current to prevent the current flowing into pin 2 of the R2.

Figure 17:
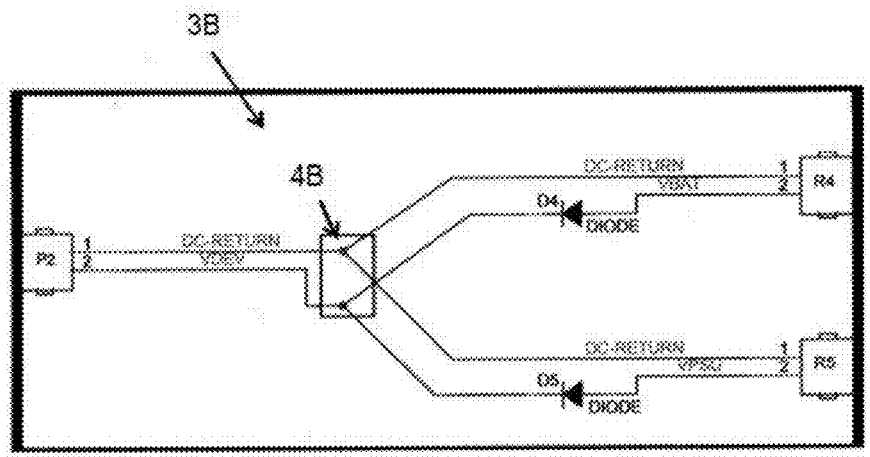
FIG. 17: Wiring Diagram of a power source of an apparatus, with the power source configured as an enclosure providing 2 independent power sources feeding 1 power device.

FIG. 17 illustrates wiring diagram of a power source of the apparatus, which is configured as an enclosure (3B) with 2 female receptacles labeled R4 and R5 configured for accepting 2 independent DC power sources, and one male plug P2 configured for connecting a power load. The selection of all components will ensure when power supply is connected to R5 it will provide the power to the load connected to P2, regardless if the battery supply is connected or not to R4. When the power supply connected to R5 is not available (failed, or no main VAC electricity applied to the power supply), the battery supply connected to R4 will provide power to load connected to P2. The selection of all components and their configuration inside the enclosure (3B) will depend on the type of interface implemented inside the enclosure (3B), which can include: wiring only, PCB only, or combination of both. Additional control components (not shown for simplicity) can be added to the enclosure (3B) to ensure protection of each device connected to enclosure (3B) according to device specifications, example: over-voltage, under-voltage, shorts, excessive current, over temperature. The control components can include sensors monitoring the status of parameters such as: voltage, current, temperature, and sending signals to embedded control device inside (3B), which will execute a pre-defined algorithm to prevent conditions from exceeding set operating criteria for the enclosure (3B), including: overheating any device within (3B) or connected to (3B).

Figure elements are labeled as follows:

R4—Power receptacle configured to accept a mating connector from a DC power source #1, such as battery. For 12V applications, R4 receptacle can be configured as an industry standard DC power receptacle 5.5 mm inside diameter barrel with 2.1 mm pin. Pin 1 of the R4 is labeled "DC-RETURN", as it will conduct current returning back to the power supply connected to R4 when in use. Pin 2 of the R4 is labeled "VBAT", as it will conduct current coming from the power supply, such as battery, connected to R4 when in use. For 12 VDC configuration: "VBAT" can be configured from +9 VDC to 12 VDC, as example. "DC-RETURN" would be 0 VDC.

R5—Power receptacle R5 configured to accept a mating connector from a DC power source #2. For 12V applications, R5 receptacle can be configured as an industry standard DC power receptacle 5.5 mm inside diameter barrel with 2.1 mm pin. As needed, R5 can be configured differently from R4, to prevent DC power source #1 from being connected to R5, and wise-versa. Pin 1 of the R5 is labeled "DC-RETURN", as it will conduct current returning back to the power supply connected to R5 when in use. Pin 2 of the R5 is labeled "VPSU", as it will conduct current coming from the power supply connected to R5 when in use. For 12 VDC configuration: "VPSU" will be regulated to +12 VDC±5%, as example. "DC-RETURN" would be 0 VDC.

P2—Power plug P2 configured to accept a mating connector from a DC power load. For 12V applications, P2 plug can be configured as an industry standard DC power plug with 2.1 mm inside diameter and 5.5 mm outside diameter barrel. Pin 1 of the P2 is labeled "DC-RETURN", as it will conduct current returning back to the active power supply connected to either R4 or R5. Pin 2 of the P2 is labeled "VDEV", as the positive voltage applied to the load connected to P2 and conduct current coming from the active power supply, either battery connected to R4, or power supply connected to R5.

4B—Junction section of the power lines inside enclosure (3B), which can be configured as: wiring only, PCB only, or combination of both. The connections between various signals are made between power lines from power supplies connected to R4 and R5, and then to the load connected to P2. Additional control components (not shown for simplicity) can be added to the enclosure (3B) to ensure protection of each device connected to enclosure (3B) according to device specifications, example: over-voltage, under-voltage, shorts, excessive current, over temperature. The control components can include sensors monitoring the status of parameters such as: voltage, current, temperature, and sending signals to embedded control device inside (3B), which will execute a pre-defined algorithm to prevent conditions from exceeding set operating criteria for the enclosure (3B), including: overheating any device within (3B) or connected to (3B).

D4—Diode component installed into line labeled "VBAT", which is rated for voltage and current to prevent the current flowing into pin 2 of the R4.

D5—Diode component installed into line labeled "VPSU", which is rated for voltage and current to prevent the current flowing into pin 2 of the R5.

Figure 18:
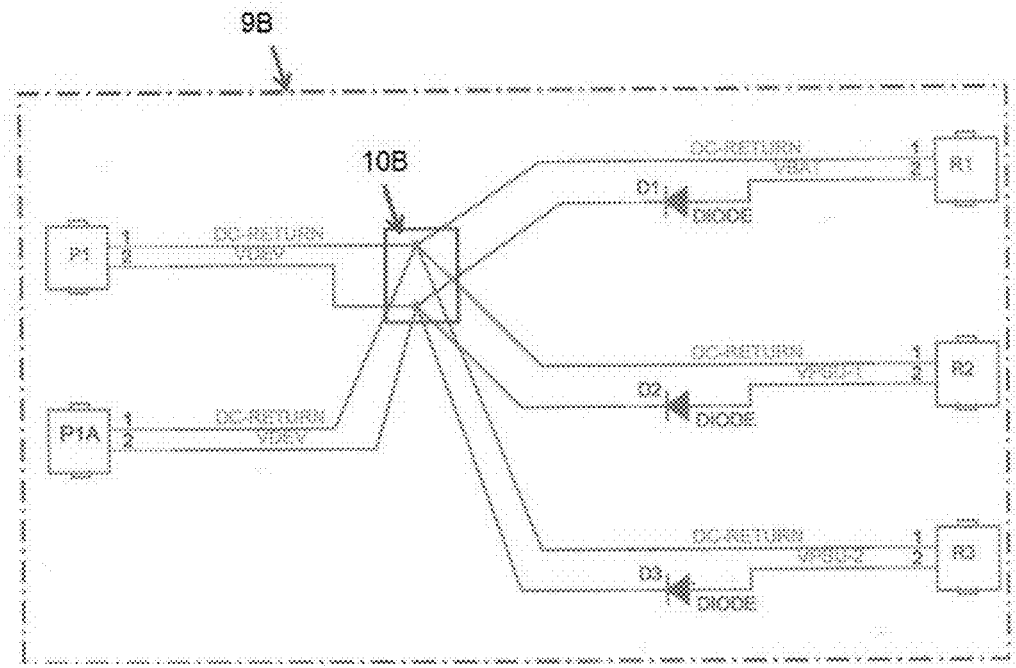
FIG. 18: Wiring Diagram of a power source of an apparatus, with the power source configured as a harness providing 3 independent power sources feeding 2 independent power device.

FIG. 18 illustrates wiring diagram of a power source of the apparatus, which is configured as a flexible harness (9B) with 3 female receptacles labeled R1, R2 and R3 configured for accepting 3 independent DC power sources, and two male plugs P1, P1A configured for connecting independent power loads. The selection of all components will ensure when power supply is connected to R2 or R3, the supply with higher output voltage will provide the power to the loads connected to P1 and P1A, regardless if the battery supply is connected or not to R1. When the power supply connected to R2 and R3 are not available (failed, or no main VAC electricity applied to the power supply), the battery supply connected to R1 will provide power to loads connected to P1 and P2. Additional control components (not shown for simplicity) can be added to the harness (9B) to ensure protection of each device connected to (9B) according to device specifications, example: over-voltage, under-voltage, shorts, excessive current, over temperature. The control components can include sensors monitoring the status of parameters such as: voltage, current, temperature, and sending signals to embedded control device inside (9B), which will execute a pre-defined algorithm to prevent conditions from exceeding set operating criteria for the harness (9B), including: overheating any device within (9B) or connected to (9B).

Figure elements are labeled as follows:

P1A—Power plug P1A configured to accept a mating connector from a DC power load, and connected or soldered directly to harness (9B). For 12V applications. P1A plug can be configured as an industry standard DC power plug with 2.1 mm inside diameter and 5.5 mm outside diameter barrel. Pin 1 of the P1A is labeled 'DC-RETURN', as it will conduct current returning back to the active power supply connected to either R1, R2 or R3. Pin 2 of the P1 is labeled "VDEV", as the positive voltage applied to the load connected to P1A and conduct current coming from the active power supply, either battery connected to R1, or power supply connected to R2 or R3.

Figure 19:
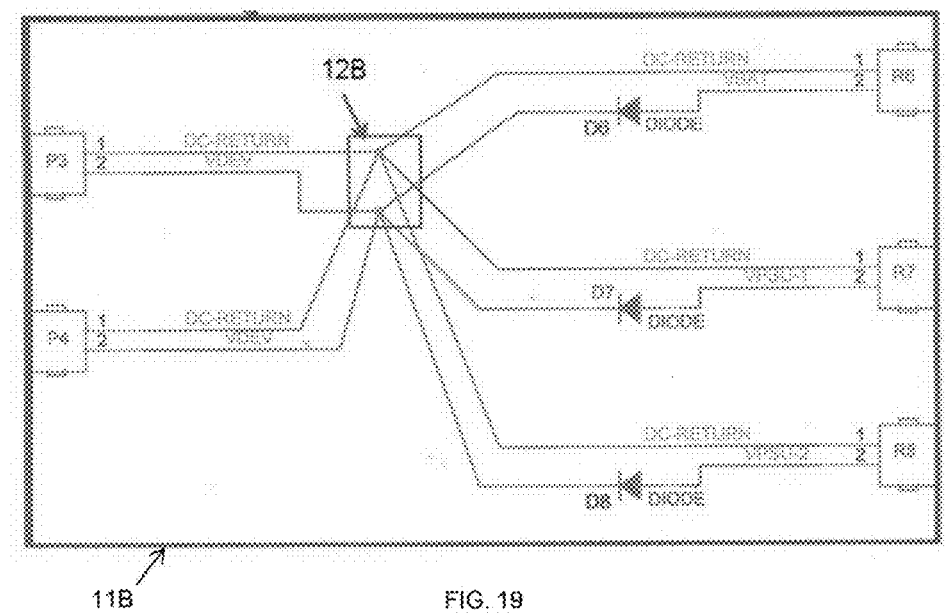
FIG. 19: Wiring Diagram of a power source of an apparatus, with the power source configured as an enclosure providing 3 independent power sources feeding 2 independent power device.

FIG. 19 illustrates wiring diagram of a power source of the apparatus, which is configured as an enclosure (11B) with 3 female receptacles labeled R6, R7 and R8 configured for accepting 3 independent DC power sources, and two male plugs P3, P4 configured for connecting 2 independent power loads. The selection of all components will ensure when power supply is connected to R7 or R8 it will provide the power to the loads connected to P3 and P4, regardless if the battery supply is connected or not to R6. When the power supplies connected respectively to R7 and R8 are not available (failed, or no main VAC electricity applied to the power supply), the battery supply connected to R6 will provide power to loads connected to P3 and P4. The selection of all components and their configuration inside the enclosure (11B) will depend on the type of interface implemented inside the enclosure (11B), which can include: wiring only, PCB only, or combination of both. Additional control components (not shown for simplicity) can be added to the enclosure (11B) to ensure protection of each device connected to enclosure (11B) according to device specifications, example: over-voltage, under-voltage, shorts, excessive current, over temperature. The control components can include sensors monitoring the status of parameters such as: voltage, current, temperature, and sending signals to embedded control device inside (11B), which will execute a pre-defined algorithm to prevent conditions from exceeding set operating criteria for the enclosure (11B), including: overheating any device within (11B) or connected to (11B).

Figure elements are labeled as follows:

D6—Diode component installed into line labeled "VBAT", which is rated for voltage and current to prevent the current flowing into pin 2 of the R6.

D7—Diode component installed into line labeled "VPSU-1", which is rated for voltage and current to prevent the current flowing into pin 2 of the R7.

D8—Diode component installed into line labeled "VPSU-2", which is rated for voltage and current to prevent the current flowing into pin 2 of the R8.

Figure 20:
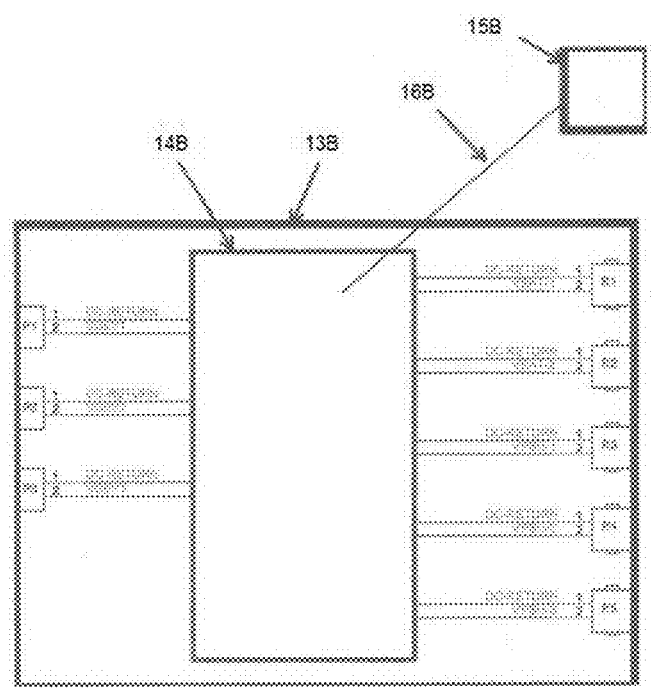
FIG. 20: Wiring Diagram of a power source of an apparatus, with the power source configured with a controller, sensors and interface to a remote HOST housed inside an enclosure, with controller providing controls and interfaces between 5 independent power sources and 3 independent power devices.

FIG. 20 illustrates diagram of a power source (13B) of the apparatus, which is configured with controller section (14B) providing: monitoring, control, and interfaces of 5 power sources connected to 5 female receptacles labeled R1 through R5, and 3 male receptacles labeled P1 through P3. Controller (14B) is interfaced via wireless connection, including INTERNET, to a remote HOST (15B).

The controller section (14B) can be configured to include embedded controller, which in turn, can be configured to have in its no-volatile memory a preset algorithm of monitor and controls functions. Monitor functions can include: monitoring electrical parameters and parameter characteristics (behavior, quality, and noise) related to voltage, current, power of each device connected to the apparatus, including: power supplies and power loads. Controller will compare in real-time obtained from sensors electrical parameters and the parameter characteristics to respective preset target ranges stored in its non-volatile memory, and then based on results of the comparison, the controller will execute in real-time without operator assistance controls over devices connected to sustain the monitored parameters within preset target ranges.

The controller can be configured to interface with a remote HOST (15B) via wired or wireless network (16B), which includes INTERNET. When connected to a HOST, the controller will execute in real time commands requested by the HOST. Controller can be configured to include user interface, and support operator entry of data, set values for monitored parameters, real-time based controls. The user interface can be configured to inform the operator of the status.

Examples of controls include:
1) Real-time specific (time-based)—when time, connect power source connected to R2 to power load connected to P2.
2) Condition or status specific—when supply voltage to power load connected to P2 is below preset target disconnect power source connected to R2 from the power load connected to P2, and connect power source connected to R3 to power load connected to P2.
3) On command from the HOST—connect battery power source connected to R1 to power load connected to P3, while keeping connections to power source connected to R5.
4) Condition or status specific—when temperature of load connected to P2 is above preset target disconnect power sources connected to P2
5) User interface—display self-diagnostics status via LED's

What is claimed is:

1. An intelligent configurable apparatus illuminating a sign; said apparatus sustaining reliability and functionality by automatically adapting to a measured ambient temperature including controlling power dissipation and/or heat generated by electronic components comprising said apparatus, and by automatically adapting to an electrical power source, including monitoring power parameters and controlling power consumption; and said apparatus comprising of:
   at least one configurable illumination module;
   at least one configurable solid-state light source;
   at least one configurable display;
   at least one configurable sensor;
   at least one configurable power source;
   at least one configurable controller;
   wherein the at least one illumination module is configured to provide illumination, including illumination for the at least one configurable display; said configurable display is either embedded into the apparatus permanently, or attached to the apparatus; said attachment supporting replacement of the display without impacting integrity of the apparatus;
   wherein the at least one solid-state light source is configured to provide illumination for the at least one illumination module; said light source providing illumination in a direction which is substantially parallel to an observer standing in front of the illumination module of the apparatus;
   wherein the at least one sensor is configured to monitor ambient environment; said environment including environment surrounding the apparatus and/or environment within the apparatus; said environment including ambient light, temperature, object proximity;
   wherein the at least one sensor is configured to monitor a power parameter of the at least one configurable power source connected to the apparatus; said power parameter including voltage and/or current;
   wherein the at least one controller is configured to connect with the at least one solid-state light source; said controller is further configured for monitoring and controlling operation of the light source;
   wherein the at least one controller is configured to connect with the at least one sensor; said controller is further configured for monitoring status of the sensor;
   wherein the at least one power source is configured to power the apparatus; said power source configurations include conventional DC power supply, battery, and solar battery;
   wherein the at least one configurable display includes at least one display element; said element is either embedded into the display permanently, or attached to the display; said attachment supporting replacement of the element without impacting integrity of the display;
   wherein the at least one display element is configured from a combination of: art, graphic elements, numeric and alpha characters;
   wherein the at least one controller is configured to execute a control algorithm; said control algorithm based on a status of the at least one sensor maintaining operation of the apparatus within an acceptance criteria;
   wherein said acceptance criteria include said apparatus adapting to a measured ambient temperature for sustaining reliability and functionality of said apparatus by executing a real-time controls of power dissipation and/or heat generated by at least one electronic component comprising said apparatus; and said adapting for low ambient temperatures includes said apparatus controlling said heat as function of said low ambient temperatures to maintain internal temperature of said apparatus above a low operating temperature limit defined by said acceptance criteria;
   wherein said acceptance criteria include said apparatus adapting to an electrical power source by comparing of at least one measured power parameter to a predefined acceptable level, and automatically switching to a new power source when a result of said comparison is outside said acceptable level; and said apparatus sustaining reliability and functionality while maximizing time of using a power source with a limited capacity, including a battery.

2. The intelligent apparatus of claim 1 further comprising; the at least one solid state light source configured as an LED, and the at least one solid state light source within the illumination module is configured to provide illumination in a direction substantially parallel to an observer standing in front of the illumination module.

3. The intelligent apparatus of claim 1 further comprising; the apparatus configured as a Illuminated sign, providing illumination of display elements of the sign, and the configuration of the apparatus include: street name sign, street address sign, traffic control sign.

4. The intelligent apparatus of claim 1 further comprising; the controller configured to include a non-volatile memory.

5. A method of controlling an intelligent configurable apparatus for illuminating a sign consisting of:
   configuring the intelligent apparatus to provide general illumination; said apparatus configuration includes configuration for operating outdoors;
   configuring the intelligent apparatus as an illuminated sign; said sign configuration includes configuration for operating outdoors;
   configuring the illuminated sign with a display, which is either attached or embedded to the illuminated sign; said display includes configuration for operating outdoors;
   programming a controller of the intelligent apparatus to execute a control algorithm and storing the algorithm within a non-volatile memory of the controller;
   setting at least one acceptable operating criteria for the controller and storing the criteria within the non-volatile memory of the controller;
   configuring the operating criteria to include a preset level of a measurement made by the controller of a status of a sensor connected to the controller;
   configuring the sensors to provide: status of an ambient and/or internal environment of the apparatus, and/or status of the power source connected to the apparatus; said sensors including: ambient light, object proximity, temperature, electrical power;
   configuring the controller for executing the algorithm stored in the non-volatile memory and maintaining operation of the apparatus within the at least one acceptable operating criteria;
   configuring the controller for executing the algorithm stored in the non-volatile memory and informing an operator when a status of the apparatus is not within the at least one acceptable operating criteria;
   configuring the controller for executing the algorithm stored in the non-volatile memory and controlling at least one illumination device within the at least one acceptable operating criteria;
   configuring the at least one illumination device including LED;

configuring the at least one acceptable operating criteria for the controller for automatically adapting the apparatus to an ambient temperature, including sustaining illumination of said sign at low ambient temperatures by controlling power dissipation and/or heat generated by electronic components comprising said apparatus;

configuring the at least one acceptable operating criteria for the controller for monitoring power parameters, and based on said criteria the controller automatically selecting an electrical power source for the apparatus, and the controller adapting the apparatus to a power source with a limited capacity including controlling said illumination to maximize use of said power source;

configuring the controller for executing the algorithm stored in the non-volatile memory and preventing damage to components of the apparatus when the status of the apparatus is not within the at least one acceptable operating criteria.

6. The method of claim 5 further comprising; wherein the configuration of the apparatus, including the configuration of the acceptance criteria, are entered by an operator, and the entry process by the operator includes operator executing a pre-defined sequences interrupting the ambient light to the ambient light sensor and affecting status of the ambient light sensor, and the entry process includes operator interrupting the ambient light within a predefined time window after power is applied to the apparatus.

7. The method of claim 5 further comprising; wherein the configuration of the apparatus, including the configuration of the acceptance criteria, are entered by an operator, and the entry process by the operator includes operator executing a pre-defined sequences affecting status of the proximity sensor, and the entry process includes operator approaching and affecting status of the proximity sensor within a predefined time window after power is applied to the apparatus.

8. The method of claim 5 further comprising; wherein the acceptance criteria for the apparatus are configured to include optimization of using energy resources, which are providing power to the apparatus; and the acceptance criteria for the apparatus include optimization of using at least one illumination device of the apparatus, and providing sufficient illumination, including general illumination, which is generated by the apparatus as function of the status of ambient sensors.

9. The method of claim 5 further comprising; wherein the intelligent apparatus configurations include illuminated street address sign, illuminated street name sign, illuminated building sign, and illuminated traffic sign, and the control algorithm of the signs contributing to environmental safety.

10. The method of claim 5 further comprising; wherein the at least one acceptance criteria is configured for the controller of the apparatus monitoring a status of the power source connected to the apparatus, and then based on the status the controller automatically switching over from a conventional power to a battery backup, and the controller automatically detecting the change in the power source, and the controller optimizing power usage by the apparatus to extend useful life of the battery backup.

11. The method of claim 5 further comprising; wherein the at least one acceptance criteria for the apparatus is configured to enable the controller of the apparatus to automatically select a power source from available power sources, and the selected power source meeting the acceptance criteria.

12. The method of claim 5 further comprising; wherein the intelligent apparatus configured for an illuminated sign, and the apparatus supporting configurations of a display of the sign, including configuration allowing replacement of the display being illuminated by the sign, and the replacement of the display having no impact on integrity of the sign.

13. The method of claim 5 further comprising; wherein the configurations of the intelligent apparatus include an interface with at least one remote controller, and the remote controller includes: mobile phones, IR remote and RF remote, and the interface protocol supporting controls, including: verification of status of the apparatus; changing configuration of the apparatus.

14. The method of claim 5 further comprising; wherein the intelligent apparatus configurations include battery backup power source sustaining operation of the apparatus during a power outage.

15. The method of claim 5 further comprising; wherein the intelligent apparatus is configured to monitor ambient temperature, and is further configured to indicate to an operator when the temperature has exceeded predefined acceptance criteria; and the apparatus contributing to environmental safety.

16. The method of claim 5 further comprising; wherein the intelligent apparatus is configured to monitor ambient light, and is further configured per at least one acceptable operating criteria to control the at least one illumination device, and the apparatus contributing to better visibility, including visibility of: street name signs, street address signs, street regulation signs, and the area surrounding the apparatus; and the apparatus contributing to environmental safety.

17. The method of claim 5 further comprising; wherein the intelligent apparatus is configured to monitor ambient temperature and/or internal temperature of the apparatus, and is further configured to detect a condition when the measured temperature is below a predefined level, and the apparatus based on the acceptance criteria controlling at least one electronic component of the apparatus with a purpose of generating self-heating within the apparatus, extending operation of the apparatus to low ambient temperatures without impacting reliability of the apparatus.

18. The method of claim 5 further comprising; wherein the controller is executing the control algorithm, including monitoring status of the sensors, and maintaining operation of the apparatus within the acceptable operating criteria at all times, and the acceptable operating criteria not exceeding limitations set by the apparatus specifications.

19. The method of claim 5 further comprising; wherein the display is configured for embedding into the apparatus, and the embedding consisting of one or combination of processes including: gluing, screening, painting; wherein the display configurations include the apparatus operating outdoors.

20. The method of claim 5 further comprising; wherein the display is configured for attaching to the apparatus, and the configuration supporting the display being replaceable without noticeable impact on the integrity of the apparatus, and a process of the attachment consisting of one or combination of processes: using at least one pocket to accept at least one perimeter tab of the display; using faceplate, which is attached to the apparatus via hidden magnets, retaining the display in-between the faceplate and the apparatus; wherein the display configurations include the apparatus operating outdoors.

* * * * *